United States Patent
Bachmann et al.

(10) Patent No.: US 9,167,486 B2
(45) Date of Patent: Oct. 20, 2015

(54) INTER-VPLMN HANDOVER VIA A HANDOVER PROXY NODE

(75) Inventors: Jens Bachmann, Oberursel (DE); Genadi Velev, Langen (DE); Shinkichi Ikeda, Kanagawa (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 946 days.

(21) Appl. No.: 13/378,301

(22) PCT Filed: May 11, 2010

(86) PCT No.: PCT/EP2010/002906
§ 371 (c)(1),
(2), (4) Date: Mar. 13, 2012

(87) PCT Pub. No.: WO2011/000448
PCT Pub. Date: Jan. 6, 2011

(65) Prior Publication Data
US 2012/0164979 A1    Jun. 28, 2012

(30) Foreign Application Priority Data
Jun. 30, 2009    (EP) .................................... 09008568

(51) Int. Cl.
*H04W 36/00* (2009.01)
*H04L 29/06* (2006.01)
*H04W 12/06* (2009.01)
*H04W 88/18* (2009.01)

(52) U.S. Cl.
CPC ......... *H04W 36/0033* (2013.01); *H04L 63/164* (2013.01); *H04W 12/06* (2013.01); *H04W 36/0066* (2013.01); *H04W 88/182* (2013.01)

(58) Field of Classification Search
USPC .......................... 455/436, 437, 442, 443, 444
See application file for complete search history.

(56) References Cited

U.S. PATENT DOCUMENTS

| 2006/0114871 | A1 | 6/2006 | Buckley |
| 2007/0097914 | A1* | 5/2007 | Grilli et al. .................... 370/329 |
| 2008/0039087 | A1 | 2/2008 | Gallagher |

(Continued)

FOREIGN PATENT DOCUMENTS

| EP | 2 007 161 | 12/2008 |
| WO | 2009/022860 | 2/2009 |
| WO | 2009/051400 | 4/2009 |

OTHER PUBLICATIONS

International Search Report dated May 4, 2011.

*Primary Examiner* — Justin Lee
(74) *Attorney, Agent, or Firm* — Dickinson Wright PLLC

(57) ABSTRACT

The invention relates to a method for performing a handover of a mobile node (MN) from a source to a target network, wherein a handover proxy node (HPN) is used to relay the handover of the MN to one of previously measured cells. The MN discovers an appropriate HPN and triggers the handover to the HPN by reporting the measurements together with the HPN ID as destination of the handover. When receiving the Handover Initiation message for handing over the MN to the HPN, the HPN will not proceed with the handover but adapts said handover to indicate a handover of the MN from the HPN to the target base station. Upon receiving the Handover Initiation message in the target network, system resources are configured for data forwarding between the source and target network, and for the data path used by the MN when attaching to the target base station.

12 Claims, 16 Drawing Sheets

(56) References Cited

U.S. PATENT DOCUMENTS

2008/0305799 A1* 12/2008 Zuniga et al. ............... 455/437
2008/0311911 A1* 12/2008 Koodli et al. ............... 455/436
2009/0164788 A1* 6/2009 Cho et al. ............... 713/175
2009/0201883 A1* 8/2009 Yan et al. ............... 370/331

* cited by examiner

US 9,167,486 B2

INTER-VPLMN HANDOVER VIA A HANDOVER PROXY NODE

FIELD OF THE INVENTION

The invention relates to a method for performing a handover of a mobile node between two networks that do not have a roaming agreement. Furthermore, the invention relates to a mobile node and a handover proxy node that participate in the invention.

TECHNICAL BACKGROUND

Communications systems evolve more and more towards an Internet Protocol (IP)-based network. They typically consist of many interconnected networks, in which speech and data is transmitted from one terminal to another terminal in pieces, so-called packets. IP packets are routed to the destination by routers in a connection-less manner. Therefore, packets comprise IP header and payload information, and the header comprises, amongst other things, a source and destination IP address.

For scalability reasons, an IP network uses a hierarchical addressing scheme. Hence, an IP address does not only identify the corresponding terminal, but additionally contains location information about this terminal. With additional information provided by routing protocols, routers in the network are able to identify the next router towards a specific destination.

LTE—Long Term Evolution

UMTS (Universal Mobile Telecommunications System) is the 3G (3rd Generation) mobile communication system standardized by 3GPP (3rd Generation Partnership Project).

The 3GPP ($3^{rd}$ Generation Partnership Project) launched a study item "Evolved UTRA and UTRAN" better known as "Long Term Evolution (LTE)". The study will investigate means of achieving major leaps in performance in order to improve service provisioning, and to reduce user and operator costs. Out of that and because interworking with other radio access technologies should be possible, the need arose for a new evolved Packet Core Network.

An exemplary representation of the E-UTRAN architecture is given in FIG. 1. The E-UTRAN consists of evolved Node Bs (eNB or eNodeB), providing the E-UTRA user plane (PDCP/RLC/MAC/PHY) and control plane (RRC) protocol terminations towards the mobile node (also referred to in the following as UEs, MS or MNs).

The eNB hosts the Physical (PHY), Medium Access Control (MAC), Radio Link Control (RLC), and Packet Data Control Protocol (PDCP) layers that include the functionality of user-plane header-compression and encryption. It also offers Radio Resource Control (RRC) functionality corresponding to the control plane. Further, it performs many functions including radio resource management, admission control, scheduling, enforcement of negotiated UL-QoS (Quality of Service), cell information broadcast, ciphering/deciphering of user and control plane data, and compression/decompression of DL/UL user plane packet headers. The eNBs are connected by means of the S1 interface to the EPC (Evolved Packet Core), more specifically to the MME (Mobility Management Entity) via the S1-MME, and to the Serving Gateway (S-GW) by means of the S1-U interface.

The S-GW routes and forwards user data packets, while also acting as the mobility anchor for the user plane during inter-eNB handovers and as the anchor for mobility between LTE and other 3GPP technologies (terminating S4 interface and relaying the traffic between 2G/3G systems and Packet Data Network Gateway). For idle state UEs, the S-GW terminates the DL data path and triggers paging when DL data arrives for the UE. It manages and stores UE contexts, e.g. parameters of the IP bearer service, network internal routing information. It also performs replication of the user traffic in case of lawful interception.

The MME is the key control-node for the LTE access-network. It is responsible for idle mode UE tracking and paging procedure including retransmissions. It is involved in the bearer activation/deactivation process and is also responsible for choosing the S-GW for a UE at the initial attach and at time of intra-LTE handover involving Core Network (CN) node relocation. It is responsible for authenticating the user (by interacting with the Home Subscriber Server, HSS). It checks the authorization of the UE to camp on the service provider's Public Land Mobile Network (PLMN) and enforces UE roaming restrictions. The MME is the termination point in the network for ciphering/integrity protection for NAS signaling and handles the security key management. The MME also provides the control plane function for mobility between LTE and 2G/3G access networks with the S3 interface terminating at the MME from the SGSN (Serving GPRS Support Node). The MME also terminates the S6a interface towards the home HSS for roaming UEs.

The Packet Data Network Gateway (PDN-GW) provides connectivity for the UE to external packet data networks by being the point of exit and entry of traffic for the UE. A UE may have simultaneous connectivity with more than one PDN-GW for accessing multiple PDNs. The PDN-GW performs MN IP address allocation, policy enforcement, packet filtering (e.g. deep packet inspection, packet screening) for each user in order to map the MN's traffic to an appropriate QoS level, charging support, lawful interception and packet screening. The PGW performs the function management of a HA in case of MIPv6 and of LMA in case PMIPv6 protocols are used for mobility. Another key role of the PDN-GW is to act as the anchor for mobility between 3GPP and non-3GPP technologies.

To summarize the above, in order to support the new E-UTRAN access, the new 3GPP Core Network is mainly separated into three logical entities. At first, in the user plane the PDN-GW is the gateway to the external networks and the global mobility anchor for mobility between 3GPP and non-3GPP access technologies (like CDMA2000, WiMAX or WIFI). Second, another user plane entity, the Serving Gateway, is the mobility anchor for mobility between 3GPP accesses (E-UTRAN, UTRAN, GERAN). Third, a Mobility Management Entity is the control plane entity responsible for the mobility management of mobile terminals moving between different EUTRAN base stations (eNodeBs) and also responsible for the session management.

As described above, the MME is responsible for mobility management and session management. For each mobile terminal attached to an MME, specific mobility management and evolved packet system context information is stored in the MME. These contexts comprise, e.g. the mobility state, the temporary identity, the current Tracking Area List, last known cell, authentication vectors, access restrictions, subscribed QoS profile, subscribed charging characteristics, and for each active PDN connection the APN (Access Point Name) in use, IPv4/IPv6 addresses, PDN-GW address for control plane, and also information for each EPS (Evolved Packet System) bearer within the PDN connection, as for example EPS bearer QoS profile, EPS bearer charging characteristics.

Public Land Mobile Networks & Roaming Agreements

A public land mobile network (PLMN) is a network that is established and operated by an administration or by a recognized operating agency for providing land mobile telecommunications services. PLMNs interconnect with other PLMNs and Public switched telephone networks (PSTN) for telephone communications or with internet service providers for data and internet access. A PLMN may be considered as an extension of a fixed network, e.g. the Public Switched Telephone Network (PSTN) or as an integral part of the PSTN. This is just one view-point on PLMN. PLMN mostly refers to the whole system of hardware and software which enables wireless communication, irrespective of the service area or service provider. A separate PLMN may be defined for each country or for each service provider.

Every PLMN organisation has its own management infrastructure, which performs different functions depending on the role played and the equipment used by that entity. However, the core management architecture of the PLMN organisation is similar, such as: providing services to its customers; infrastructure to fulfil the services (advertise, ordering, creation, provisioning, . . . ); assuring the services (Operation, Quality of Service, Trouble Reporting & Fixing . . . ); billing the services (Rating, Discounting, . . . ).

Not every PLMN organisation will implement the complete Management Architecture and related processes. Some processes may be missing depending on the role a particular organisation is embodying. Processes not implemented by a particular organisation are accessed via interconnections to other organisations, which have implemented these processes. The Management architecture itself does not distinguish between external and internal interfaces.

A MN subscribed to 3GPP services has a home PLMN (HPLMN) that maintains the subscription data, allowed services and QoS levels. When the MN is attached to a network different from the HPLMN, the MN is indicated as roaming node and the visited network is denoted as visited PLMN (VPLMN).

In general, "roaming" can be defined as the ability for a cellular customer to automatically make and receive voice calls, send and receive data, or access other services, including home data services, when travelling outside the geographical coverage area of the home network, by means of using a visited network.

The differentiation between HPLMN and VPLMN is technically given by the type of subscriber entry in a specific network. When a mobile device enters a new visited network and has no entry in the home subscriber register of the network (e.g. Home Location Register, HLR, in GSM networks or local customer database in WLANs), the required subscriber data must first be requested by the visited network e.g. from the subscriber's home network in order that the subscriber can be authenticated and any authorization for using the network services can be checked. The "visiting" subscriber acquires an entry in a user database of the visited network (e.g. Visited Location Register, VLR) and the authorized network services are enabled. If there is no roaming agreement between the two networks, i.e. HPLMN and VPLMN, maintenance of service is impossible, and service is denied by the visited network.

A roaming user is connected to the E-UTRAN, MME and S-GW of the visited network. However, by using the home network's PDN-GW, the user has access to the home operator's services even while in the visited network.

Generic Access Network (GAN)

Another system specified by 3GPP and independent from LTE/SAE is the Generic Access Network (GAN) also known as Unlicensed Mobile Access (UMA). GAN provides access to mobile operator services and to the 3GPP core network using a generic IP connection (e.g. WLAN+DSL). With GAN certain 3GPP protocols are tunnelled from the terminal over the IP connection to the 3GPP Core Network (see FIG. 2). Furthermore, GAN supports seamless handover between wireless LANs and the 3GPP access for dual-mode terminals. On the cellular network, the mobile terminal communicates over the air with a NodeB, through a base station controller, to nodes in the core network. Under the GAN system, when the terminal detects a wireless LAN, it establishes a secure IP connection through a gateway to a server called a GAN Controller (GANC) on the 3GPP network. The GANC presents itself to the mobile core network as a standard cellular base station. The terminal communicates with the GANC over the secure connection using existing GSM/UMTS protocols. Thus, when the terminal moves from a 3GPP to an 802.11 network, it appears to the core network as if it is simply on a different base station.

In the following, some of the standard GAN procedures will be described with reference to FIG. 5-9. Some of the embodiments of the invention partly reuse messages of the GAN protocol to perform an improved handover.

Discovery Procedure

When a MS supporting GAN first attempts to connect to a GAN, the MS needs to identify the Default GANC. Each GAN capable MS can be configured with the FQDN (or IP address) of the Provisioning GANG. The MS first connects to a GANC in the HPLMN of the MS, by establishing a secure IPsec tunnel and a TCP connection using the provisioned or derived addresses. The MS obtains the FQDN or IP address of the Default GANC in the HPLMN through the Discovery procedure. The following steps of the discovery procedure are illustrated in FIG. 5.

1. If the MS has a provisioned or derived FQDN of the Provisioning GANC, it performs a DNS (Domain Name Service) query to resolve the FQDN to an IP address.
2. The DNS Server returns a response including the IP Address of the Provisioning GANC.
3. The MS establishes a secure tunnel to the Provisioning GANC.
4. The MS sets up a TCP connection to a well-defined port on the Provisioning GANC. It then queries the Provisioning GANG for the Default GANC, using GA-RC DISCOVERY REQUEST. The message contains:
   Cell Info: Either current camping GERAN/UTRAN cell ID, or last LAI where the MS successfully registered, along with an indicator stating which one it is.
   Generic IP access network attachment point information: AP-ID
   MS Identity: IMSI.
5. The Provisioning GANG returns the GA-RC DISCOVERY ACCEPT message, using the information provided by the MS (e.g. the CGI, Cell Global Identifier), to provide the FQDN or IP address of the Default GANC. This is done so the MS is directed to a "local" Default GANC in the HPLMN to optimize network performance.
6. If the Provisioning GANC cannot accept the GA-RC DISCOVERY REQUEST message, it returns a GA-RC DISCOVERY REJECT message indicating the reject cause.
7. The secure IPsec tunnel to the Provisioning GANC is released. It shall also be possible to reuse the same IPsec tunnel for GAN Registration procedures. In this case the IPsec tunnel is not released.

Registration Procedure

Following the Discovery procedure the MS establishes a secure tunnel with the secure gateway of the Default GANC, provided by the Provisioning GANG in the Discovery procedure, and attempts to register with the Default GANG. The Default GANG may become the Serving GANG for that connection by accepting the registration, or the Default GANG may redirect a MS performing registration to a different Serving GANG.

GANC redirection may be based on information provided by the MS during the Registration procedure, operator chosen policy or network load balancing. The following steps for the registration procedure are illustrated in FIG. 6.

1. If the MS was provided the FQDN of the Default or Serving GANG, the MS shall perform a DNS query to resolve the FQDN to an IP address.
2. The DNS Server returns a response.
3. The MS shall then set up a secure IPsec tunnel to the GANG. This step may be omitted if an IPsec tunnel is being reused from an earlier Discovery or Registration.
4. The MS then sets up a TCP connection to a TCP port on the GANG. The TCP port can either be a well-known port or one that has been earlier received from the network during Discovery or Registration. The MS shall attempt to register on the GANG by transmitting the GA-RC REGISTER REQUEST. The message includes:
   Cell Info: Either current camping GERAN/UTRAN cell ID, or last LAI where the MS successfully registered, along with an indicator stating which one it is. In addition, the MS includes the UARFCN of the current serving cell (if that cell is a UTRAN cell). Generic IP access network attachment point information: AP-ID.
   MS Identity: IMSI.
5. If the GANG accepts the registration attempt it shall respond with a GA-RC REGISTER ACCEPT. The message contains:
   GAN specific system information (e.g.):
   GAN Mode Indicator: GAN A/Gb mode or GAN Iu mode.
   Cell description of the GAN cell:
      a. If GAN Iu mode selected: The UTRA ARFCN (UARFCN) and Primary Scrambling Code (PSC) corresponding to the GAN cell.
   Location-area identification comprising the mobile country code, mobile network code, and location area code corresponding to the GANC cell.
   Cell identity identifying the cell within the location area corresponding to the GAN cell.
   In this case the TCP connection and the secure IPsec tunnel are not released and are maintained as long as the MS is registered to this GANC.
6. Alternatively, the GANC may reject the request. In this case, it shall respond with a GA-RC REGISTER REJECT indicating the reject cause. The TCP connection and the secure IPsec tunnel are released
7. Alternatively, if the GANC wishes to redirect the MS to (another) Serving GANC, it shall respond with a GA-RC REGISTER REDIRECT providing the FQDN or IP address of the target Serving GANC. In this case the TCP connection is released and the secure IPsec tunnel is optionally released depending on if the network indicates that the same IPsec tunnel can be reused for the next registration.

PS (packet switched) Handover from UTRAN to GAN (Preparation Phase) FIG. 7a

1. Based on measurement results and knowledge of the RAN topology, the source SRNC decides to initiate a combined hard handover and SRNS relocation.
2. The source SRNC sends a Relocation Required message (Relocation Type, Cause, Source ID, Target ID, Source RNC To Target RNC Transparent Container) to the SGSN.
3. The SGSN determines the target cell is the GANC, based on the contents of Relocation Required. It then sends the Relocation Request message (Permanent NAS UE Identity, Cause, CN Domain Indicator, Source RNC To Target RNC Transparent Container, RAB To Be Setup) to the GANG.
4. One or more GAN PTCs are established between the GANG and MS. Upon the GA-RRC PTC establishment, the PS domain GA-RRC sublayer entity in the MS enters the PTC-ACTIVE substate.
5. The GANG sends the Relocation Request Acknowledge message (Target RNC To Source RNC Transparent Container, RABs Setup, RABs Failed To Setup) to the SGSN.

PS Handover from UTRAN to GAN (Execution Phase) FIG. 7b

1. Upon receiving the positive acknowledgement from the GANG to serve the MS, the SGSN initiates the Execution Phase by sending the Relocation Command to the source SRNC.
2. a) The RNC may start forwarding GTP PDUs to the GANG while still transmitting them in the downlink to the MS. This forwarding is routed via the Iu-PS interface. The GANG may buffer, start a blind transmission of downlink user data towards the MS over the allocated PTC(s), or discard these forwarded GTP PDUs, depending on the QoS profile, network conditions, and whether it supports data forwarding.
   b) The RNC instructs the MS to initiate the switch to GAN via the Physical Channel Reconfiguration message.
   c) The RNC sends the Forward SRNS Context message to the GANG via the SGSN.
3. Immediately after receiving the Physical Channel Reconfiguration message, the MS sends GA-RRC RELOCATION COMPLETE message to the GANG. Upon receiving this message and the Forward SRNS Context message, the GANG becomes the Serving RNC.
4. Immediately upon receiving the GA-RRC HANDOVER COMPLETE message from the MS, the GANG sends the Relocation Detect message to the SGSN.
5. The GANG sends the Relocation Complete message to the SGSN.
6. The MS, GANC and CN exchange user data via the established PTC.
7. The SGSN releases the Iu-PS connection with the old RNC.
8. If the Routing Area of the GANC cell (as indicated by the GANC to the MS in GAN registration) is different from that under the old RNC, then the MS performs the Routing Area Update procedure.

PS Handover from GAN to UTRAN (Preparation Phase) FIG. 8a

1. The MS is in active packet flow exchange with active PDP Context(s) and PTC(s) in the GAN.
2. The GANC may send a GA-RRC UPLINK QUALITY INDICATION if there is a problem with the uplink quality for the ongoing session. Uplink Quality Indication is information sent by the GANC to the MS indicating the crossing of an uplink quality threshold in the uplink direction. Whenever the MS receives an indication of bad quality, it should start the relocation procedure, as described in the next step. Alternatively, MS can use its local measurements to decide to initiate the handover procedure.

3. The MS decides to initiate a PS handover from GAN to UTRAN by sending GA-RRC RELOCATION INFORMATION message to the GANC. The GA-RRC RELOCATION INFORMATION message indicates a list of target cells, identified by cell ID, in order of preference for PS handover, and includes the received signal strength for each identified cell.

4. The GANC selects a target RNC based on the contents of the GA-RRC RELOCATION INFORMATION message. It sends a Relocation Required message to the SGSN containing the selected RNC information.

5. The SGSN sends a Relocation Request message to the target RNC.

6. The RNC performs the necessary allocation of radio and Iu transport resources.

7. The RNC returns a Relocation Request Acknowledge message to the SGSN. This message contains a transparent container that contains channelization information needed by MS to access UTRAN.

PS Handover from GAN to UTRAN (Execution Phase) FIG. 8*b*

1. The SGSN begins the Execution Phase by issuing the Relocation Command message to the GANC. The message contains the channel access information in the target UTRAN cell.

2. a) The GANC sends the GA-RRC RELOCATION COMMAND to the MS. This message contains the information from the Relocation Command received in Step 1 earlier.
   b) The GANC also sends the Forward SRNS Context message to the target RNC via the SGSN.

3. The SGSN relays the Forward SRNS Context message to the target RNC.

4. Upon receiving the GA-RRC RELOCATION COMMAND, the MS immediately suspends uplink GTP PDU transfer. It immediately begins accessing the UTRAN using the indicated channelization parameters in the message. The MS's access attempt is detected by the Node B and RNC, and is reported to the SGSN via the Relocation Detect message.

5. The MS completes the lower layer setup and configuration, and sends the RRC Physical Channel Reconfiguration Complete to the target RNC. This triggers the target RNC to send the Relocation Complete message to SGSN. At this stage, the target RNC assumes the role of SRNC for the MS.

6. The packet data flow is now active via the UTRAN.

7. The SGSN releases the Iu-PS connection by sending the Iu Release Command message to the GANC, to which GANG responds with Iu Release Complete message.

8. If the Routing Area of the UTRAN cell is different from that of the GAN cell, then the MS performs the Routing Area Update procedure.

PTC Activation when Gang Receives Relocation Request

The following FIG. 9 depicts the Packet Transport Channel activation procedure when the GANG receives the Relocation Request message from the SGSN.

1. The MS has successfully registered with the GANG. The MS, GANG and SGSN perform signalling procedures related to PS handover.

2. The SGSN sends the Relocation Request message to the GANG and includes the RAB ID, the CN Transport Layer Address (IP address) and the CN Iu Transport Association (GTP-U Tunnel Endpoint Identifier, TEID) for user data.

3. The GANG sends the GA-RRC RELOCATION REQUEST message to the MS to request activation of the Packet Transport Channel(s) for PS handover purposes. The message includes the RAB ID, a TEID that the GANG assigns to the MS for downlink data transfer, the GANG PTC IP Address (i.e., the destination address for PTC GA-RRC PDU messages from the MS) and the GANG TEID assigned by the GANG for uplink data transfer, for each of the RABs.

3. The MS acknowledges the activation of the PTC(s) in the GA-RRC RELOCATION REQUEST ACK message. The PS domain GA-RRC sublayer entity in the MS transitions to the GA-RRC-CONNECTED state and the PTC-ACTIVE substate for each PTC and starts the PTC Timer for each PTC.

4. The GANG sends the Relocation Request Ack message to the SGSN to complete the handover preparation procedure. The GANG includes the RAB ID, the RAN Transport Layer Address (i.e., the GANC's Iu-PS IP address) and the RAN Iu Transport Association (i.e., the TEID that the GANG assigned to the MS) for each RAB.

5. PS handover is performed.

6. The MS transfers uplink user data by sending a GA-RRC PDU message to the GANG PTC IP address received in step 3. The message includes the GANG TEID received in step 3, which allows the GANG to relay the GA-RRC PDU message payload using the correct GTP-U tunnel on the Iu-PS interface. The GANG relays the message payload to the SGSN in the Iu-PS G-PDU message.

7. The SGSN transfers downlink user data by sending a Iu-PS G-PDU message to the GANG Iu-PS IP address received in step 5. The message includes the MS TEID received in step 5, which allows the GANG to relay the Iu-PS G-PDU message payload using the correct PTC on the Up interface. The GANG relays the message payload to the MS in the GA-RRC PDU message.

The specific scenario explained in the following applies to the above described 3GPP system environment. The starting point of the scenario is that a roaming UE, i.e. the UE is connected to a cell of a base station (eNB) of a visited network operator (e.g. VPLMN1), is moving out of coverage of VPLMN1's cells. One exemplary use case for this scenario is that the VPLMN1 cell is a macro cell and the user is entering a subway station or underground shopping mall and the power of the signal of the VPLMN1 cells is too low to reach the UE in the underground. Furthermore, there is no other base station of VPLMN1 deployed in the underground, however, cells of other operators (e.g. VPLMN2) are in the coverage of the UE in the underground, for example because the VPLMN2 operator has deployed eNBs covering smaller cells in the underground.

In order to support seamless mobility in the scenario described above, it should be possible for an active UE to handover from cells of VPLMN1 to cells of VPLMN2 (see FIGS. 3 and 4).

The capability of performing seamless handover may depend on the relationship between the different operators of the VPLMNs. For example, if there is a special kind of mutual roaming relationship/agreement between all the involved operators, i.e. the home operator of the UE (HPLMN), the visited operator VPLMN1 and the visited operator VPLMN2, the networks may be configured to support active handover, i.e. the source access eNBs are aware of the target access eNBs, and context transfer and data forwarding between the two visited PLMNs is possible. However, if there is a roaming agreement between the home operator of the UE (HPLMN) and VPLMN1 and also an agreement between HPLMN and VPLMN2, but no specific roaming agreement between VPLMN1 and VPLMN2, an active handover with context transfer etc. is not possible.

Even if the UE is able to measure the VPLMN2 cell and report information to the source eNB to which the UE is still connected, the source eNB is not aware of the target eNB, i.e. does not know the target eNB to which the UE shall perform the handover. And even if the source eNB would be aware of the Enhanced Global Cell Identity (ECGI) of the target cell and would request handover, the source MME in the VPLMN1 network may not find the target MME or is not allowed to trigger active handover to the target network, and thus, the UE will not be triggered to do handover. In addition, the UE will not be informed about an unsuccessful handover attempt to VPLMN2.

Thus, if there is no special roaming agreement between VPLMN1 and VPLMN2, after loosing coverage, the UE has to search for a new cell in VPLMN2 and do an attach, thereby disrupting the service.

In the following two possibilities are presented to perform a handover between two VPLMNs that do not have a roaming agreement for allowing an active/seamless handover of a MN.

One possible solution is that the UE, prior to loosing coverage completely, goes to IDLE mode and starts to scan cells of other PLMNs in the vicinity. Then, when a cell of another VPLMN is found, the UE can connect to the new cell and perform a Tracking Area Update (TAU) with the "active flag" set. Because of the active flag, the MME triggers activation of all radio and S1 bearers, thus the user plane is setup and the session continuity is guaranteed.

However, this mechanism would still require at least some kind of roaming relationship between VPLMN1 and VPLMN2, because during the TAU procedure the new MME contacts the old MME to retrieve context information for the UE. Further, the handover performance is not optimal in this case. Downlink data sent from the HPLMN to the old VPLMN can get lost, and delivery is delayed during the scanning phase of the VPLMN2 cells and during the handover execution, because bearers in the target access are setup in a re-active manner.

A first sub-issue of the IDLE mode solution above is when the UE starts with the handover procedure. As already mentioned, there is no special roaming agreement between VPLMN1 and VPLMN2, and therefore, VPLMN1 eNBs are not aware of VPLMN2 eNBs. Even if the UE reports VPLMN2 cells to the VPLMN1 eNB, the VPLMN1 eNB is not able to trigger the handover.

One possibility to overcome this issue is that the UE measures and compares the signal strength of the eNB in VPLMN1 and of the eNB in VPLMN2. If the source eNB signal strength is below a threshold and the target eNB signal strength is above a threshold, the UE does not wait for the Handover Command from the source eNB any longer, but starts with the handover to the new eNB in VPLMN2.

This UE behaviour may cause a UE-initiated handover although network-initiated is also possible. The problem is that the UE does not know that there is no special roaming relationship between the two PLMNs and that the source eNB can not trigger the handover. Thus, one way to avoid that the UE falsely initiates the handover is that in case the source MME can not send a handover (forward relocation) request to the target MME, the UE is informed by the source MME/eNB that network-initiated handover is not possible. Only then, the UE starts with handover attach to the new eNB in VPLMN2.

As already mentioned, the second sub-issue of the IDLE mode solution explained above is that even this solution requires some kind of roaming relationship between VPLMN1 and VPLMN2. This can be avoided by the UE indicating the HPLMN as source network during the TAU procedure. Then, the target MME will ask the HPLMN about the context, and the HPLMN can retrieve the context from the source MME. Another problem is that there is still a handover delay, because the UE is already attached to the target eNB before context is retrieved from the source access.

SUMMARY OF THE INVENTION

Therefore, in view of the above problems in the state of the art, one object of the invention is to provide an improved method of performing a seamless handover of a mobile node between two networks. In particular, the two networks do not have an agreement that would allow a seamless handover to be performed. In addition, another object of the invention is that the handover should also work with legacy networks, i.e. with no functional changes to the equipment of the networks.

At least one of the above objects is solved by the subject matter of the independent claims. Advantageous embodiments of the invention are subject-matters of the dependent claims.

According to one aspect of the invention, a seamless handover of a mobile node between two networks is performed via an entity in another network, that bridges the handover by forwarding/adapting all necessary messages of the handover. After a handover is decided, the handover is initiated as if the mobile node would perform the handover from the source network to said bridging entity in the other network.

However, said bridging/proxy entity in the other network knows that the handover is actually to be performed not towards itself but to the target network. Consequently, the proxy entity does not carry on with the initiated handover, but adapts said handover to be a handover of the mobile node from the proxy entity to the target network. Accordingly, the proxy entity needs to adapt and forward messages of the control signaling related to the initiated handover between the source and target network. Correspondingly, the user plane data paths are established, and if data forwarding is used, the proxy entity also forwards data packets from and to the mobile node. Overall, the proxy entity acts as an intermediary for performing the handover between the source and target network.

The proxy entity is advantageously provided in the home network of the mobile node. The proxy entity allows to perform a handover between two network that normally would not allow a seamless handover due to missing roaming agreements.

One embodiment of the invention provides a method for performing a seamless handover of a mobile node from a source network to a target network. A handover proxy node is located in a further network. A handover procedure of the mobile node from the source network to the handover proxy node is initiated by using an identifier of the handover proxy node. Then, the handover proxy node relays the control signalling, related to the initiated handover procedure, between the source network and the target network using a previously received identifier of the target network in order to perform a seamless handover of the mobile node from the source network to the target network.

In an advantageous embodiment of the invention the step of initiating the handover procedure comprises that the mobile node decides to perform a handover to the target network and then transmits a handover trigger message to a source base station to which the mobile node is connected in the source network. The handover trigger message indicates the handover proxy node as the destination of the triggered handover. The source base station then transmits a handover initiation message towards the handover proxy node, upon receiving the handover trigger message.

According to another embodiment of the invention, the mobile node discovers the handover proxy node in the further network.

Now relating to a further embodiment of the invention, the step of relaying by the handover proxy node the control signalling comprises that the handover proxy node receives a handover initiation message, indicating a handover of the mobile node from the source network to the handover proxy node. The handover proxy node adapts the handover initiation message to indicate a handover of the mobile node from the handover proxy node to the target network, using the identifier of the target network. Then, the handover proxy node transmits the adapted handover initiation message towards a target base station in the target network.

For yet another embodiment of the invention the identifier of the target network is provided to the handover proxy node when discovering by the mobile node the handover proxy node in the further network, or in a dedicated message to the handover proxy node.

According to an advantageous embodiment of the invention, the step of discovering the handover proxy node comprises the registration of the mobile node with the handover proxy node for establishing a connection therebetween.

In a different embodiment of the invention the identifier of the target network is provided to the handover proxy node in the handover initiation message from the source base station as follows. The mobile node performs measurements in the target network and determines an extended identifier of the target network based on the performed measurements in the target network. The mobile node then adapts the extended identifier of the target network to allow the source base station to determine the identifier of the handover proxy node as destination of the triggered handover by the mobile node, and to allow the handover proxy node to determine the identifier of the target network for adapting the handover initiation message to indicate a handover of the mobile node from the handover proxy node to the target network. The adapted extended identifier is inserted by the mobile node into the handover trigger message transmitted to the source base station, and the source base station inserts the received extended identifier into the handover initiation message to the handover proxy node.

According to another embodiment of the invention, the identifier of the target network is provided to the handover proxy node in the handover initiation message from the source base station as follows. The mobile node generates a first predetermined cell identifier that allows the source base station to determine the handover proxy node as destination of the triggered handover by the mobile node, and that allows the source base station to generate a second predetermined cell identifier that allows the handover proxy node to determine the identifier of the target network. The value of the first predetermined cell identifier is out of a range of valid values used for a cell identifier, wherein the source base station determines the handover proxy node based on the first predetermined cell identifier being out of range, and the handover proxy node determines the identifier of the target network based on the particular value of the second predetermined cell identifier.

In a more detailed embodiment of the invention the identifier of the handover proxy node is provided to the mobile node when discovering by the mobile node the handover proxy node in the further network.

For another embodiment of the invention the handover proxy node is informed that the handover initiation message for the mobile node is to be adapted to indicate a handover of the mobile node from the handover proxy node to the target network.

Relating to a further embodiment of the invention, the step of discovering the handover proxy node in the further network comprises that a handover proxy node is selected that is optimal for the source and target network.

According to a different embodiment of the invention, a source base station, to which the mobile node is connected in the source network, allocates measuring gaps in the downlink resources for the mobile node. Thus, the mobile node can measure cells in neighbouring networks of the source network. The allocation is performed when the mobile node indicates to the source base station that no cells of neighbouring networks could be measured, or that the mobile node supports radio access technologies, wherein the radio access technologies are not supported by the mobile node, or indicates a cell identifier, unknown to the source base station.

In another embodiment of the invention a predetermined channel condition information is transmitted from the mobile node to the source base station to trigger a discontinued reception mode for the mobile node. Then, the mobile node performs measurements on cells in neighbouring networks of the source network during the time of the discontinued reception mode.

For yet another advantageous embodiment of the invention the mobile node transmits a measuring gap request to an upper-stream node of the data path, over which the mobile node is receiving data packets. According to said request, the upper-stream node buffers incoming data packets for the mobile node for a pre-determined time. In said pre-determined time the mobile node performs measurements on cells in neighbouring networks of the source network.

According to a further improved embodiment of the invention, the measuring gap request comprises a token, and the token is inserted into the last data packet transmitted from the upper-stream node to the mobile node before starting the buffering the incoming data packets for the mobile node. Thereby, the MN knows when to start the measurements, and also knows from the pre-determined time, how long it may perform the measurements before new data packets will arrive.

Relating to another embodiment of the invention, the mobile node is authenticated in the target network by using authentication information for the mobile node used for authenticating the mobile node in the source network. In an alternative embodiment of the invention, the mobile node is authenticated in the target network using a target network specific authentication key. Said target network specific authentication key is generated by the handover proxy node, using information specific to the target network authentication key.

The handover proxy node replaces a source network specific authentication key in a handover initiation message received from the source network with the generated target network specific authentication key. Then the handover proxy node forwards the handover initiation message, comprising the generated target specific authentication key, to the target network.

In a more advantageous embodiment of the invention, the generated target network specific authentication key is transmitted from the handover proxy node to the mobile node. Alternatively, the information specific to the target network authentication key is transmitted from the handover proxy node to the mobile node, and the mobile node generates the target network specific authentication key using the received information specific to the target network authentication key.

For an embodiment of the invention the source network and target network do not hold a roaming agreement with each other that allows a seamless handover between the source and target network. In addition, the further network respectively holds a roaming agreement with the source and target network that allows a seamless handover between the further network and respectively the source and target network. Advantageously, the further network is the home network of the mobile node.

A further embodiment of the invention provides a mobile node for performing a seamless handover from a source network to a target network. A handover proxy node is located in a further network. A processor of the mobile node initiates a handover procedure from the source network to the handover proxy node, using an identifier of the handover proxy node. The processor informs the handover proxy node to relay the control signalling, related to the initiated handover procedure, between the source network and the target network using a previously received identifier of the target network, in order to perform a seamless handover of the mobile node from the source network to the target network.

According to another embodiment of the invention, the processor decides to perform a handover to the target network, and a transmitter transmits a handover trigger message from the mobile node to a source base station to which the mobile node is connected in the source network, indicating the handover proxy node as the destination of the triggered handover.

Still a further embodiment of the invention provides a handover proxy node located in a further network for relaying a handover of a mobile node from a source network to a target network. A receiver of the handover proxy node receives a handover of the mobile node from the source network to the handover proxy node, including an identifier of the handover proxy node. A processor of the handover proxy node relays the control signalling, related to the received handover of the mobile node, between the source network and the target network using a previously received identifier of the target network, in order to perform a seamless handover of the mobile node from the source network to the target network.

BRIEF DESCRIPTION OF THE FIGURES

In the following the invention is described in more detail with reference to the attached figures and drawings.

DETAILED DESCRIPTION

Definitions

Figure 1:
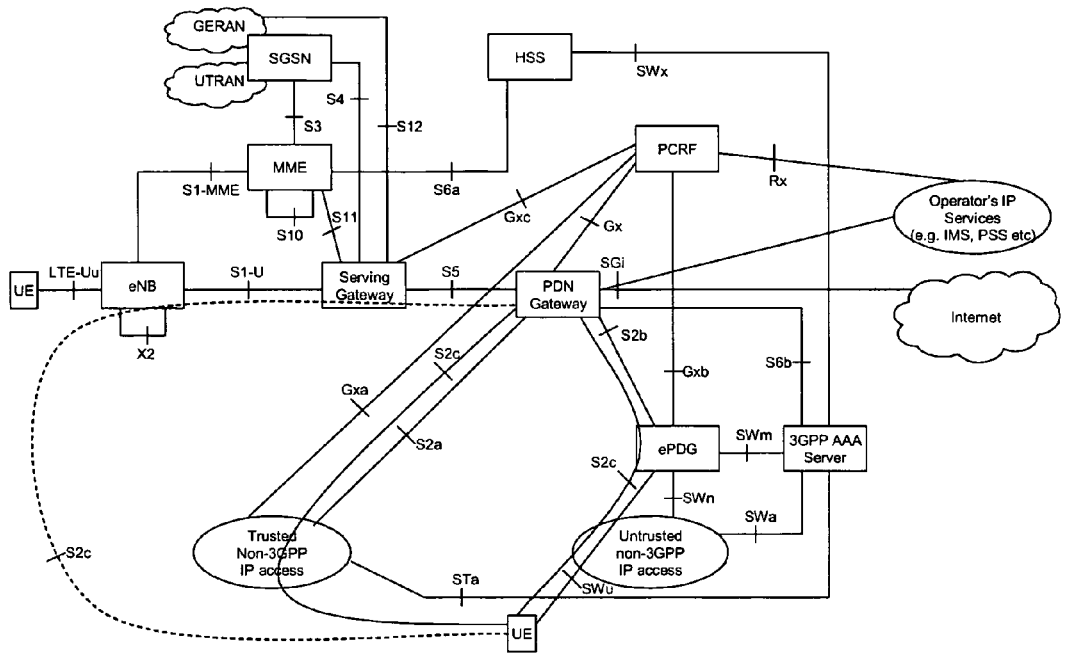
FIG. 1 illustrates the high-level architecture of an LTE system.
Figure 2:
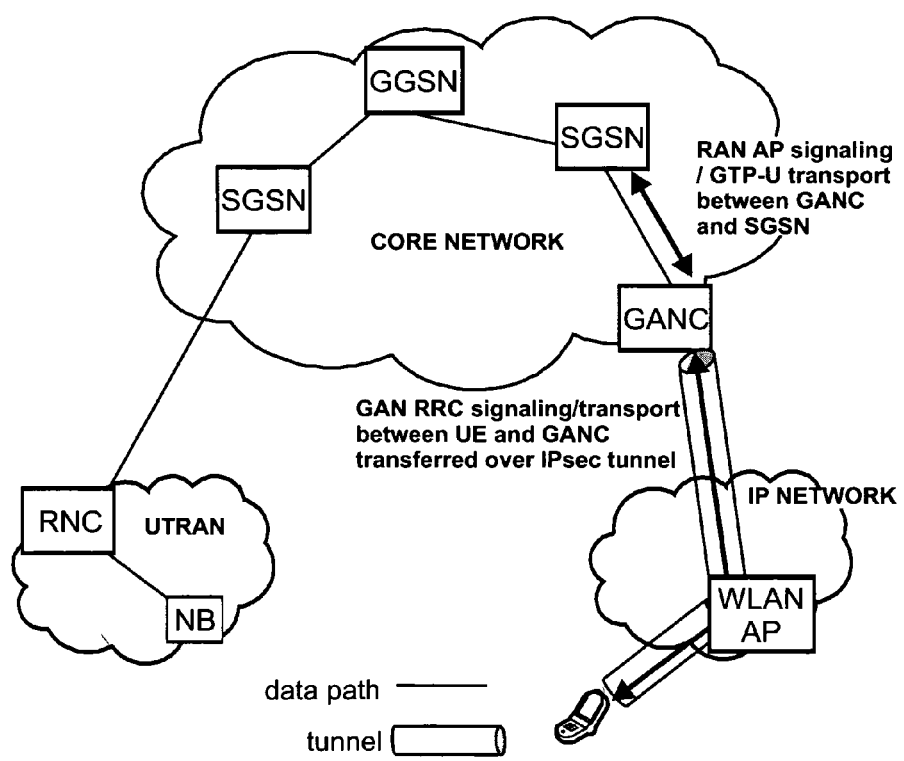
FIG. 2 discloses the network deployment of a standard Generic Access Network.
Figure 3:
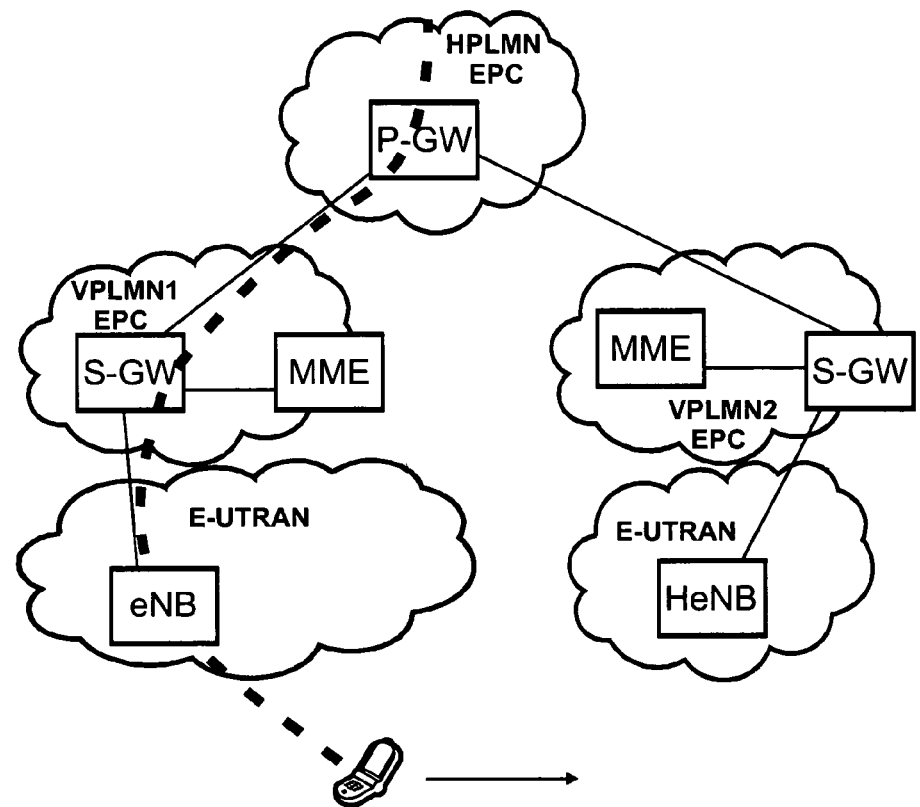
FIGS. 3 and 4 illustrate the data paths between a mobile node and the core network during an inter-VPLMN handover of a mobile node.
Figure 4:
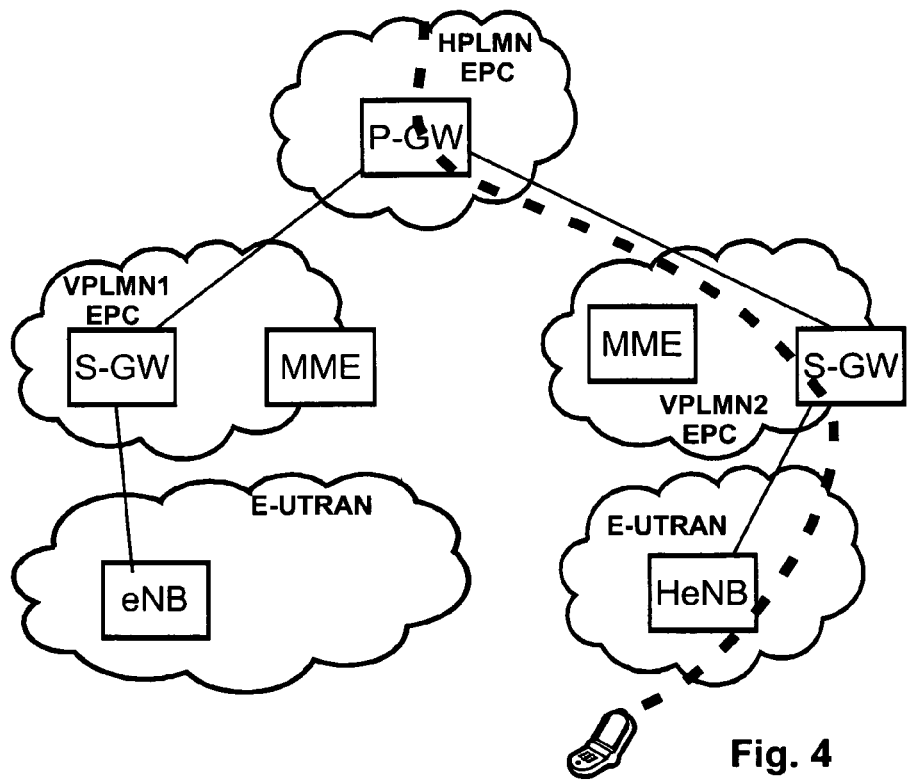

In the following a definition of a few terms frequently used in this document will be provided.

A mobile node is a physical entity within a communication network. One node may have several functional entities. A functional entity refers to a software or hardware module that implements and/or offers a predetermined set of functions to other functional entities of a node or the network. Nodes may have one or more interfaces that attach the node to a communication facility or medium over which nodes can communicate. Similarly, a network entity may have a logical interface attaching the functional entity to a communication facility or medium over it may communicate with other functional entities or correspondent nodes.

A handover proxy node is a functional entity which may be implemented in a separate entity or co-located with other entities of the core network, such as the GAN-Controller or the PDN-GW. Accordingly, said handover proxy node may include e.g. GANC/PDN-GW/eNB/MME/S-GW functionality for interworking with other network elements and performing its functions. For instance, the handover proxy node may terminate the S10 reference point that is used for MME relocation, as used for a handover. In any case, the handover proxy node is configured to perform the function of allowing a mobile node handover between two networks to be performed indirectly by bridging the handover across a third network of the Handover Proxy Node, which usually would be the home network of the mobile node.

A seamless handover (also known as soft handover) may be understood as a handover in which no service disruption occurs for the mobile node, i.e. where the communication performed by the mobile node is not interrupted because of the handover.

In the following, several embodiments of the invention will be explained in detail. The explanations should not be understood as limiting the invention, but as a mere example of the general principles of the invention. A skilled person should be aware that the general principles of the invention as laid out in the claims can be applied to different scenarios and in ways that are not explicitly described herein.

A first example for solving the problem of doing an inter-VPLMN handover is to use a GAN Controller (GANC) in the HPLMN. The procedure of this example is described below in more detail with reference to FIG. 10. As will be explained, the GAN protocol is used together with the usual RRC protocol to basically perform two handovers, one from VPLMM1 to the GANC and shortly afterwards one from the GANG to VPLMN2. The GAN protocol is mainly used for direct communication between the UE and the GANC. For the remaining messages the usual RRC protocol and RRC messages may be employed.

The UE establishes a tunnel to the GANC in the HPLMN over the source access, e.g. an existing 3GPP access connection (step 1).

Then, while being still actively connected to the source access, the UE tries to measure cells of other PLMNs. When a cell of another VPLMN2 is found to which a handover could be preferable (for example because of a better signal quality), the UE triggers a handover to the GANG by transmitting an RRC Measurement Report to the source eNB, including the GANG cell ID as target cell ID for the handover (step 2). Accordingly, the source eNB initiates the handover procedure by transmitting a Relocation Request message (step 3) including the ECGI (Enhanced Cell Global Identifier) of the GANG which was determined by the source eNB from the received cell ID.

One or more Packet Transport Channels (PTCs) are established between the GANG and the MN (step 4). After resources (Packet Transport Channels) are established between the UE and the GANG, the UE is triggered to switch to the GANG by first transmitting a Relocation Command message to the source eNB and then transmitting the Handover Command from the source eNB to the mobile node (steps 5-6). Accordingly, the UE is thus informed that the resource and user plane configuration of the handover to the GANG is complete. However, instead of transmitting a Handover Complete message to the GANG to initiate the path switching and thus definitely finalize the handover, the UE sends immediately after receiving the Handover Command message a GA-RRC Relocation Information message to the GANC (step 7) to trigger another handover to the target eNB in VPLMN2. The GA-RRC Relocation Information message comprises the cell identification of the target network, i.e. the target eNB.

The handover of the mobile node from the GANG to the target eNB again comprises the transmission of Relocation Request and Relocation Command messages (steps 8 and 9) to start configuring the necessary resources between the target network and the mobile node. The mobile node is informed of the handover to the target eNB using the GA-RRC Relocation Command message (step 10).

The UE completes the handover to the GANG (step 11) and immediately afterwards it completes the handover to the target eNB (step 12).

However, while this solution allows the inter-PLMN handover for a mobile node, using the GAN Controller in the HPLMN as described above with reference to FIG. 10, it has some drawbacks and may cause problems, such as:
  Packet Transport Channels (PTC) between GANC and UE are unnecessarily established, which consumes resources and causes a delay.
  The handover may fail because the source access may disconnect the UE before the UE has triggered the handover to the target eNB (e.g. when the base station instructs the MN to switch to the GANG, and thus stops transmitting data packets).
  In case the source access starts to forward packets to the GANC and continues transmitting packets in downlink, loop and flooding is produced, because the GANG still sends packets to the source access.

Figure 10:
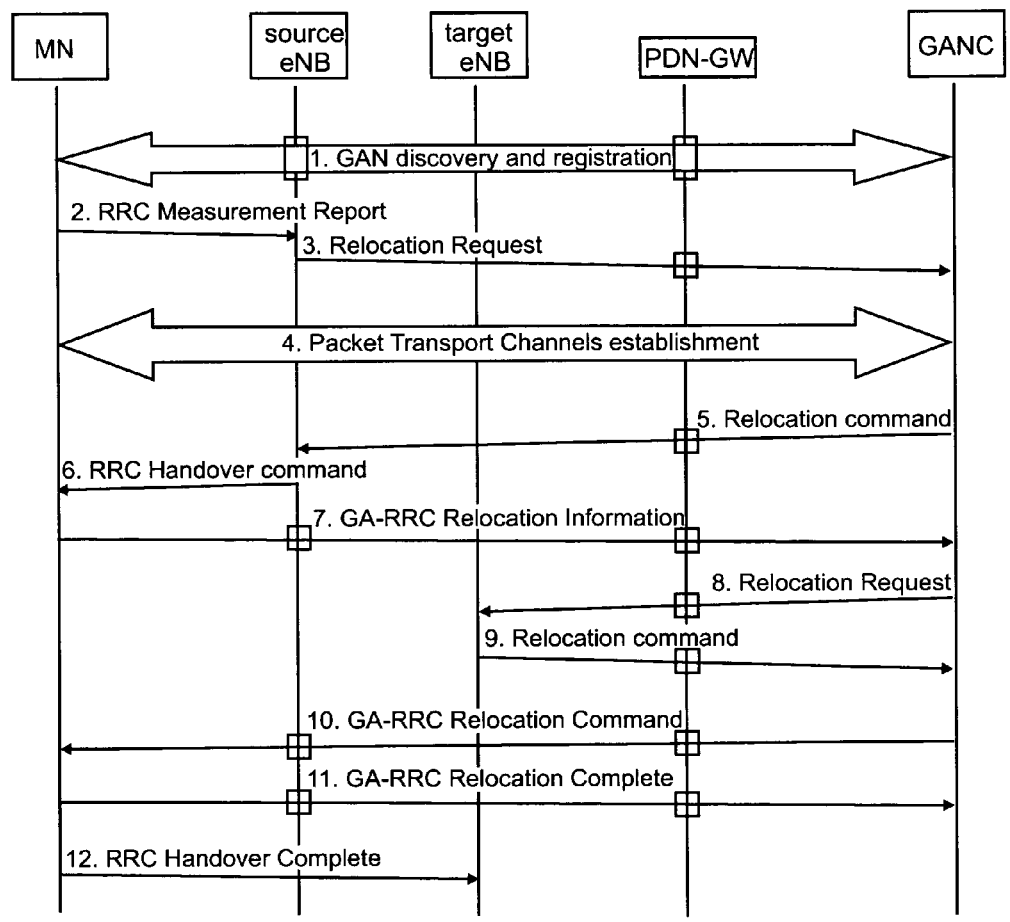
FIG. 10 is a signaling diagram of an inter-VPLMN handover based on the GAN protocol according to a first example.
Figure 11:
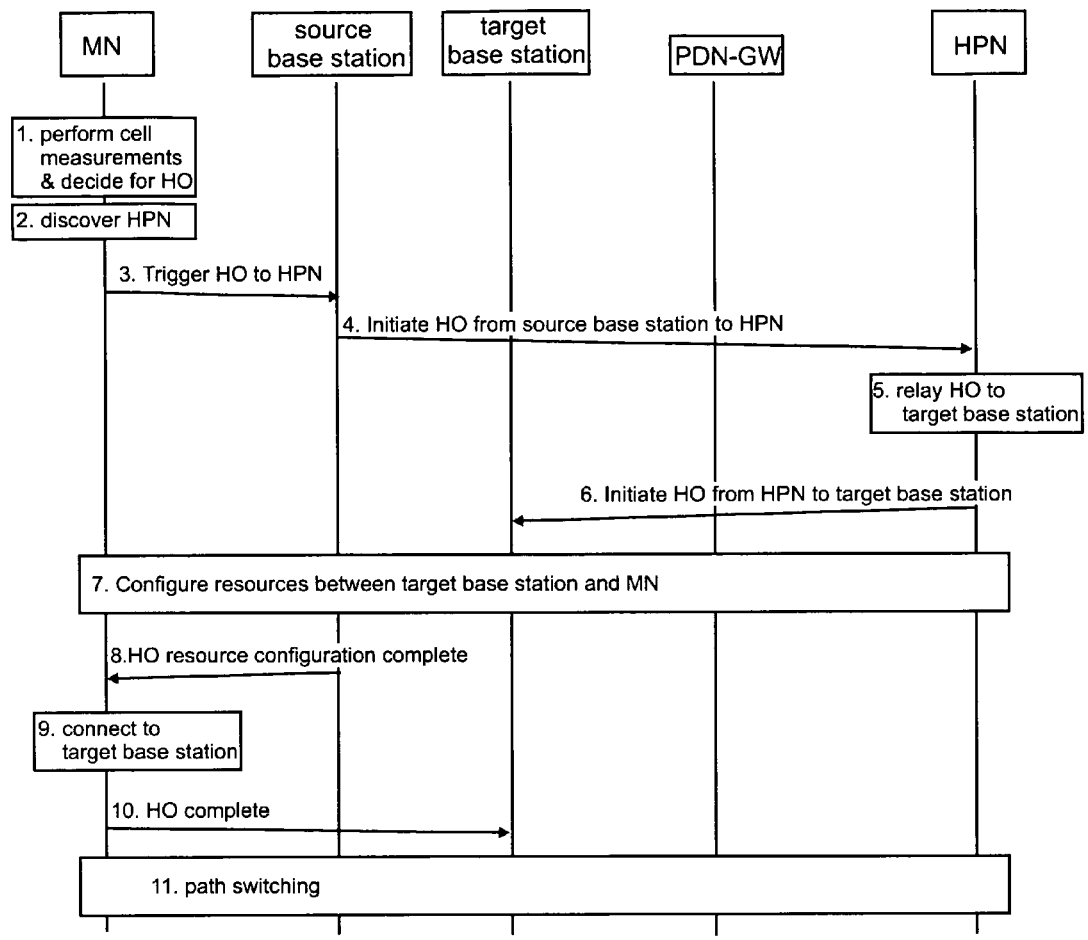
FIG. 11 is a signaling diagram of an inter-VPLMN handover according to an embodiment of the invention.

One embodiment of the invention provides an improved handover procedure which overcomes the drawbacks of the identified prior art and the above mentioned disadvantages of the GAN procedure in FIG. 10. The following embodiment of the invention is illustrated in FIG. 11.

A mobile node is currently connected to a source base station in a source network and is receiving data packets via a data path from the core network, in particular via the PDN-GW, a source S-GW and the source base station.

The mobile node may regularly perform measurements on other cells in networks that are bordering the source network in which the MN is currently located (step 1). In case the cells are camped on other frequencies than the one the MN is currently using, measuring gaps have to be generated in the downlink resources for the MN to shift to said different frequency and to perform the measurements. In case the other cells are on the same frequency, no measuring gaps as such have to be allocated to the MN, but the MN may perform the measurements when possible.

In any case, the mobile node performs inter/intra frequency measurements and based on same he may decide that a handover to one of the measured cells is advantageous for a particular reason. As will be explained later on in more detail, there may be different criteria for the MN to decide when a handover is beneficial or not, such as depending on the location, or on the signal strength, or on the communication costs. Furthermore, the MN may have to measure more than one cell to which a handover is beneficial and thus needs to decide to which particular cell to hand over. The decision might be taken in view of a priority list of neighbouring cells or by comparing the load in the cells as criteria. Alternatively, the MN may report the measurements on the various cells to a particular server in its home network which in turn takes the decision and informs the MN accordingly. Said server might also be the handover proxy node which is introduced with this embodiment of the invention.

Overall, for the following explanation of the embodiment of FIG. 11 it is assumed that the MN performs the cell measurements and decides for a handover to a particular target base station in a target network. The MN might already know or learns that there is no roaming agreement between the source network and the target network, and thus no seamless handover to the target network would be possible. Therefore, as soon as the MN decides for a handover to said target network, that does not have a roaming agreement with its current source network, it will try to discover an appropriate handover proxy node (HPN) in its home network or other appropriate network which will relay the handover between the source network and the target network (step 2). Any network is appropriate that has roaming agreements with VPLMN1 and with VPLMN2 for respectively allocation handover and context transfers. The MN discovers the HPN for instance using an HPN identifier from which the MN generates a FQDN, which is transmitted to a DNS (Domain Name Service) server. The DNS server responds with the corresponding IP address of the HPN. The mobile node may now register with the HPN and get an HPN ID, such as a cell identifier.

The MN will then trigger in its source base station the handover to the HPN, by reporting the measurements together with the HPN ID as destination of the triggered handover (step 3). In response thereto, the source base station will initiate the handover as instructed by the MN, i.e. will start transmitting an initiation message of the handover procedure to the HPN (step 4).

It is assumed that the HPN has been informed previously (not shown in FIG. 11) or with the first message of the initiated handover procedure that the handover is not actually destined to the HPN but to a particular target base station in a target network. There are various possibilities as how to inform the HPN about UE's real intentions, some of which will be presented in more detail later. For instance, when discovering the HPN, the UE may immediately inform same about the real destination of a handover that will be initiated for said same UE shortly after.

Correspondingly, when the HPN receives a Handover Initiation message (step 4) from the source base station for handing over the MN to the HPN, the HPN will not proceed with the handover but will adapt said received Handover Initiation message or even generate a new Handover Initiation message that indicates a handover of the mobile node from the HPN to the target base station in the target network (step 5).

After adapting/replacing the received Handover Initiation message, the adapted/new Handover Initiation message will be transmitted to the target base station to proceed with the handover according to this embodiment (step 6). Upon receiving the Handover Initiation message in the target network, system resources are configured to allow data forwarding between the source network and the target network, and to prepare the data path that will be used by the MN when attaching to the target base station (step 7). In other words, the control signaling related to the initiated handover is relayed by the HPN to the target eNB and adapted/replaced where necessary to achieve an overall handover from the source network to the target network.

When the resources are all configured, the MN is informed in said respect (step 8), so that the MN may now detach from the source base station and connect to the target base station. The target base station is then informed about the successful connection of the mobile node to the target base station (step 10). In response thereto, the target eNB initiates the path switching in the nodes so that data packets destined to the MN will be routed to the MN at its new location at the target base station.

Overall, from source access perspective the MN is triggered to handover to the HPN, and from the target access perspective the MN is handing over from the HPN to the target access.

The above described embodiment of the invention sets out the principles behind the invention. However, the embodiment can be varied according to common knowledge of a skilled person.

In the embodiment of FIG. 11 it is assumed that the MN discovers the HPN. This step is however not mandatory, since alternatively the MN may already have information pre-configured on HPNs available in the home or another appropriate network. In said case, the MN does not need to perform a discovery step, but merely needs to acquire a HPN identifier from an internal database or similar. Or, another entity (such as the source base station) discovers the HPN and informs the mobile node accordingly. Those are only some of the available options to provide the mobile node with information on the HPN, in order for the mobile node to be allowed to trigger in the source base station the handover to the HPN.

As already hinted at before, the identification of the target network, i.e. target eNB, can be provided to the HPN in various ways. During the discovery/registration of the HPN the UE may communicate with the HPN, and may thus already include the target network identity into one of the messages. Alternatively, when no discovery of the HPN is necessary, a dedicated message may be transmitted from the MN to the HPN in order to inform same about the target network identifier. Also, the HPN may be informed about the actual handover destination for the mobile node with the handover initiation message it receives from the source base station. In any case, the HPN needs to be notified that the handover of the MN initiated by the source eNB to the HPN is actually to the target network, thus allowing the HPN to function as a relay for said handover.

Moreover, the MN may measure more than one cell and would thus need to decide to which cell to perform the handover. Alternatively, the MN may provide the measurement results on the various cells to the HPN (e.g. during the discovery/registration of HPN), and the HPN may then decide among the possible target networks to which target network the MN will be handed over.

Figure 12:
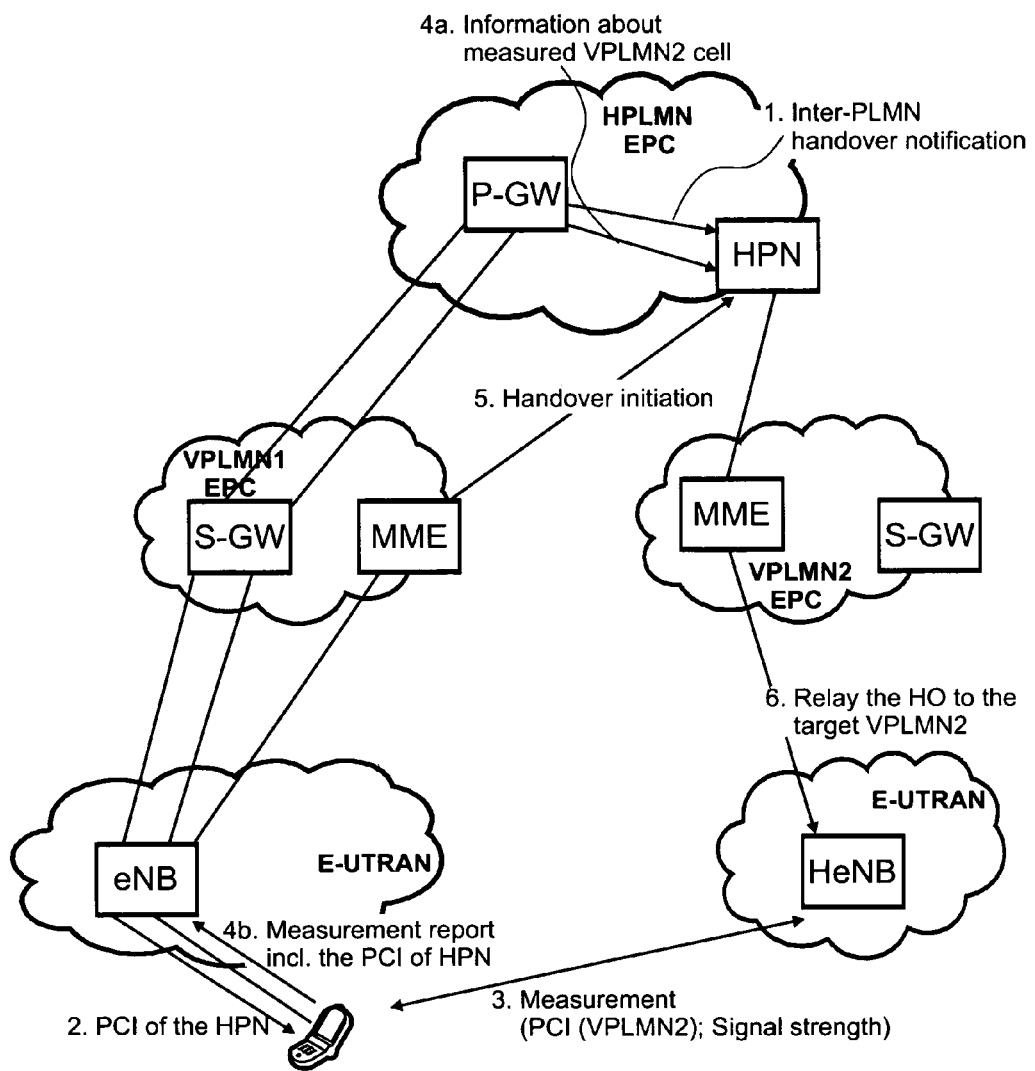
FIG. 12 shows a network deployment and message exchange for an inter-VPLMN handover according to an embodiment of the invention.

Another embodiment of the invention will be described in the following with reference to FIG. 12, which discloses the network deployment of the scenario of the embodiment and the exchange of messages in order to perform a seamless handover. This embodiment differs from the previously described embodiment of FIG. 11 in some aspects. It is assumed for this scenario that the MN is currently connected to VPLMN1 and will perform a handover to VPLMN2. The HPN is located in the Home PLMN of the mobile node.

The MN establishes a connection with the HPN over an existing PDN-GW connection, when the UE detects than an inter-VPLMN handover may be preferable. During the connection establishment with the HPN the MN may indicate that the connection is only provisional or it sends a notification about the intention to do an inter-PLMN Handover in order to inform the HPN that a handover triggered shortly after will not be a handover to the HPN but to another target network that is still to be indicated to the HPN (step 1). The MN receives from the HPN information including a Physical Cell ID of the HPN (step 2).

The MN again measures cells of a neighbouring VPLMN2 and decides to perform the inter-VPLMN handover (step 3). In the previous embodiment this step is only performed previous to discovering the HPN and is used to determine that an inter-VPLMN handover may be preferable. The MN sends information about the measured Physical Cell ID of the target VPLMN2 to the HPN (step 4a), and simultaneously reports the measurements on the target VPLMN2 together with the Physical Cell ID of the HPN to the source eNB to trigger the inter-PLMN handover (step 4b).

In response thereto, the source eNB initiates the handover procedure to the HPN via the responsible source MME. The HPN knows from the previously received notification (step 1) that the handover initiated by the source eNB for the MN (step 5) is an inter-VPLMN handover, and thus the HPN acts as a proxy and relays the HO to the target VPLMN2 (step 6). After all resources to the target VPLMN2 are established, the MN may detach from the old cell of VPLMN1 and connect to the new cell in VPLMN2.

The HPN may be implemented in different ways. In one variant the Proxy Node may have PDN-GW capabilities, thus allowing the MN to establish an additional PDN connection to the HPN in case a handover is foreseeable. Another possible variant is that the HPN has ePDG capability and the MN may thus establish an IKEv2/IPsec tunnel to the HPN. Moreover, the signaling protocol between the MN and the HPN used for informing the HPN about the measurements and the target eNB can be a new protocol or based on an existing protocol. For instance the IKEv2 protocol mentioned before may be used, and in particular the IKEv2 INFORMATIONAL exchange with a new payload or an existing payload (e.g. notify or configuration payload) may be used.

Figure 13:
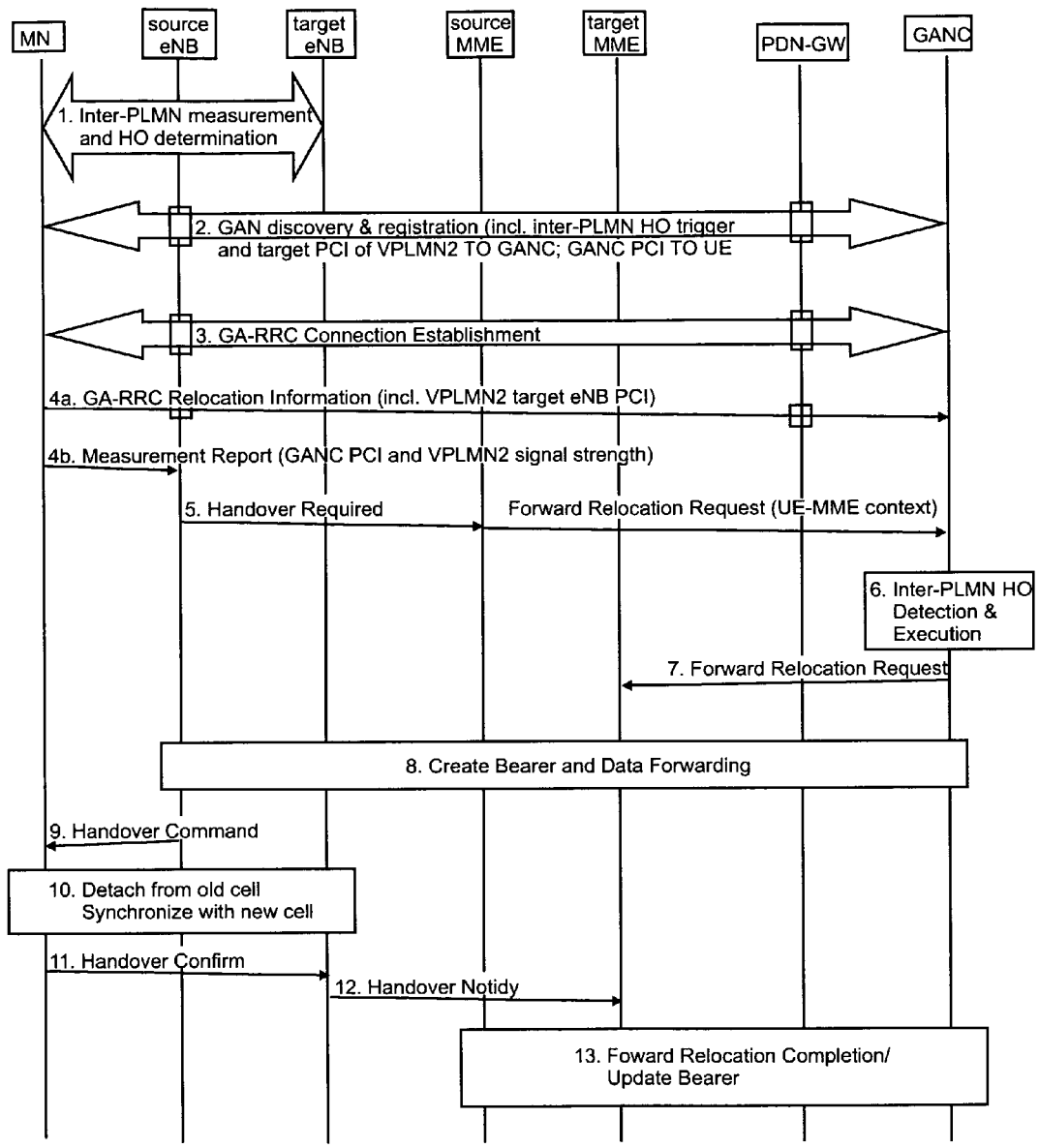
FIG. 13 is a signaling diagram of an inter-VPLMN handover according to a detailed embodiment of the invention partly implemented with the GAN protocol.

Still another possibility will be presented in the following detailed embodiment of the invention. In order to implement the principles of the invention into existing system, the GAN protocol is used to provide a direct communication link between the MN and the HPN, which is assumed in this example to be collocated with the GANC. Accordingly, an enhanced GAN controller is provided in which the HPN is collocated with the standard GAN controller functionalities. The various steps performed in this embodiment are illustrated in the signaling diagram of FIG. 13.

Figure 5:
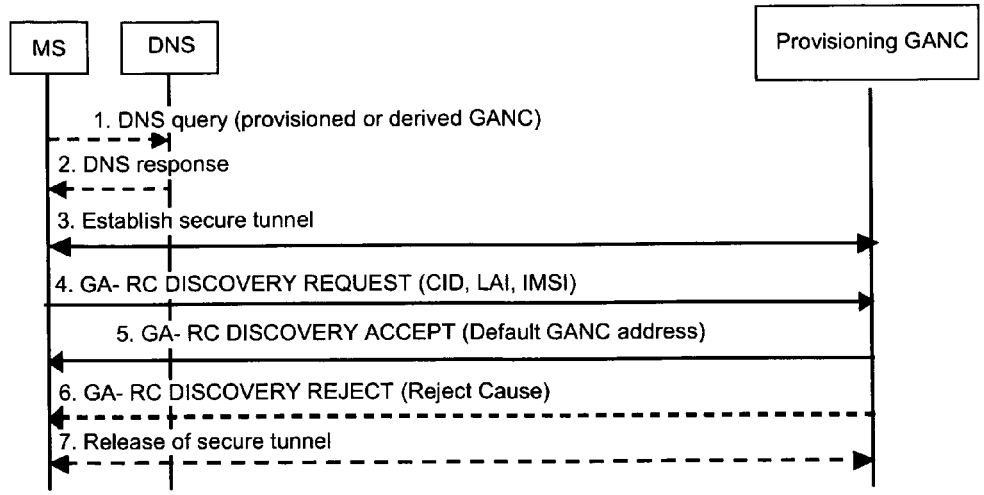
FIG. 5 is a signaling diagram for a standard GAN discovery procedure.
Figure 6:
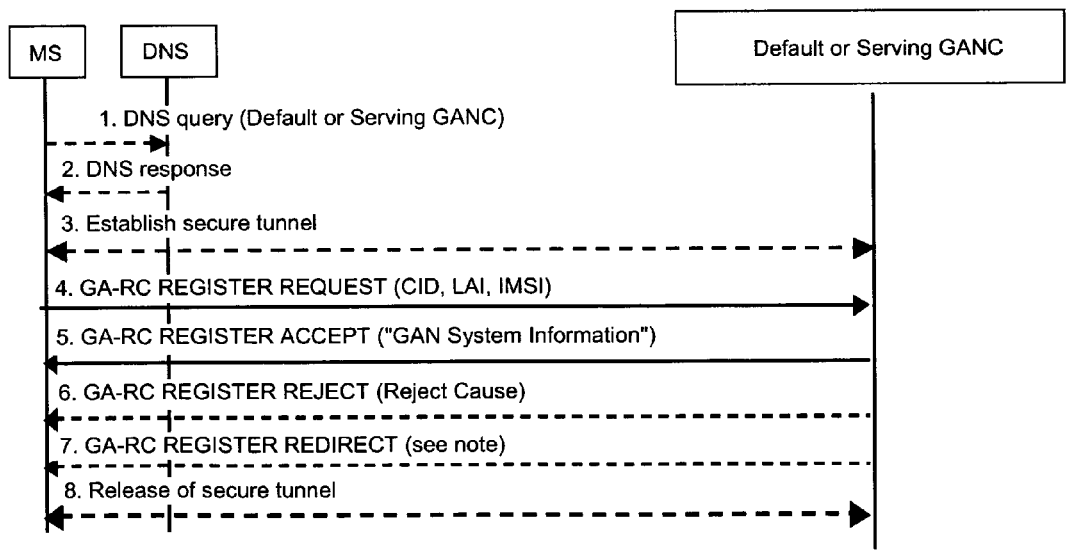
FIG. 6 is a signaling diagram for a standard GAN registration procedure.

1. Based on inter-PLMN measurements the UE detects that an inter-VPLMN handover may be preferable. The UE also learns the Physical Cell Identifier (PCI) of the target base station in the target network.
2. The UE discovers a GANG in its HPLMN (using for example DNS within the standard GAN discovery procedure of FIG. 5) and registers with the GANC, i.e. establishes a IPsec connection using IKEv2 (see FIG. 6 and the standard GAN registration procedure. The UE sends a trigger to the GANC that the established connection is only provisional or about the intention to do an inter-PLMN handover to the target network, VPLMN2. In this embodiment it is assumed that during the GAN registration (e.g. with GA-RC Register Request message of FIG. 6) the PCI of the target eNB is transmitted to the GANC. Advantageously, the PCI of the target eNB may also be used to discover an optimal GANC from both, VPLMN1 and VPLMN2 point of view.

In more detail, the registration of the UE with the discovered GANC can be done using the GA-RC REGISTER REQUEST message. This message usually includes the Cell ID, LAI, UARFCN, AP-ID, IMSI. Here, the Cell-ID, LAI may be related to VPLMN1 information, and the intention for inter-PLMN handover may be indicated by an AP-ID that comprises the PLMN ID of the VPLMN2 cell. During the registration procedure the UE receives system information including the GANC cell ID, for example by the GANC replying with a GA-RC REGISTER ACCEPT message including GAN specific system information (i.e. UARFCN, Primary Scrambling Code, MCC, MNC, LAC, Cell ID).

3. The UE establishes a GAN specific RRC connection with the GANC.
4. The UE sends (4a) the measured information about the other VPLMN2 3GPP access in a GA-RRC RELOCATION INFORMATION message, including the Physical Cell ID of the target eNB. Optionally, the UE may include in the GA-RRC RELOCATION INFORMATION message the VPLMN2 ID in order to facilitate the identification of the target eNB based on the PCI, e.g. in case the PCI value is not unambiguous. Furthermore, the measured signal strength may also be transmitted from the UE to the GANC. For instance, in case more than one cell is measured by the UE, instead of the UE deciding to which target access to perform the handover, the GANC may upon receiving several measurements results in the GA-RRC RELOCATION INFORMATION message determine to which target eNB the MN will be handed over.

Basically at the same time, the UE triggers the handover procedure by transmitting (4b) a measurement report to the source eNB, including the GANC cell ID from the previously received GA Registration procedure, and the signal strength of the target VPLMN2 cell.
5. The source eNB, based on the received measurements, initiates a Handover by transmitting a Handover Required message, including the identity of the GANC as destination of the handover, to the source MME. The source eNB maps the received PCI of the GANC to the ECGI of the GANG, and then transmits the Handover Required message to the source MME. The source MME in turn determines from the ECGI the "target MME" being the GANC and sends a Forward Relocation Request (including the UE MME context) to the GANC.
6. The GANC detects that the Forward Relocation Request belongs to the UE that previously transmitted the inter-PLMN HO trigger (see step 2) and the identifier of the actual destination of the handover (see step 4a). In more detail, the GANG knows the UE from its previous registration, and can infer from the IMSI (International Mobile Subscriber Identity) in the UE-MME context of the Forward Relocation Request message, that no regular handover is to be performed. Thus, no Packet Transport Channels (PTC) are set up. Instead, the GANG triggers the handover to the target eNB based on the information provided by the UE, by generating a Forward Relocation Request with another UE-MME context and having the target eNB as destination and the GANG as source eNB of the adapted handover.
7. The GANG is operating as a Proxy Node and is forwarding the handover from the source eNB to the target eNB. In more detail, the GANC identifies from the PCI of the target eNB the corresponding target MME to which the Forward Relocation Request message is to be transmitted. The Forward Relocation Request includes the modified UE-MME context, and the identity of the handover destination, which is the identity of the real target eNB in VPLMN2.
8. When the target MME receives the Forward Relocation Request, bearers are set-up and the data forwarding for the seamless handover is prepared. Step 8 will be explained in more detail with reference to FIG. 14. In summary, the target MME upon receiving the Forward Relocation Request message, selects a new S-GW and transfers the MME-UE bearer contexts to the new S-GW in the target VPLMN2 (see steps 8.1-8.2). The target MME sends a Handover Request to the target eNB to create the UE context in the target eNB, including information about the bearers, and the security context. The target eNB sends a Handover Request Acknowledge message to the MME (including a Target-to-Source transparent container) (see steps 8.3-8.4). The data forwarding path (for indirect forwarding) from source to target access is established, i.e. the target MME sets up forwarding parameters in the target S-GW, and the target MME informs the GANC with a Forward Relocation Response about the target S-GW address and TEIDs (Tunnel Endpoint Identifier) for indirect forwarding. After that the GANG informs the source MME about the GANG address and TEIDs for indirect forwarding, and the source MME informs the source S-GW about the addresses and TEIDs for forwarding (see steps 8.5-8.10). Finally the source MME sends a Handover Command (including Target to Source transparent container, Bearers subject to forwarding, Bearers to Release) message to the source eNodeB. The Bearers subject to forwarding includes list of addresses and TEIDs allocated at the source S-GW for forwarding. The Bearers to Release includes the list of bearers to be released (see step 8.11).
9. The Handover Command is sent to the UE using the Target to Source transparent container.
10. The UE detaches from the old cell and synchronizes with the target cell.
11. The UE sends a Handover Confirm message to the target eNodeB. Downlink packets forwarded from the source eNodeB via the GANC can be sent to the UE. Also, uplink packets can be sent from the UE, which are forwarded to the target Serving GW and on to the PDN GW.
12. The target eNodeB sends a Handover Notify (TAI+ECGI) message to the target MME.
13. The source MME is informed via the GANG about the completion of the relocation. The source MME triggers release of resources in the source network. The target MME triggers the update of the bearers.

Figure 14:
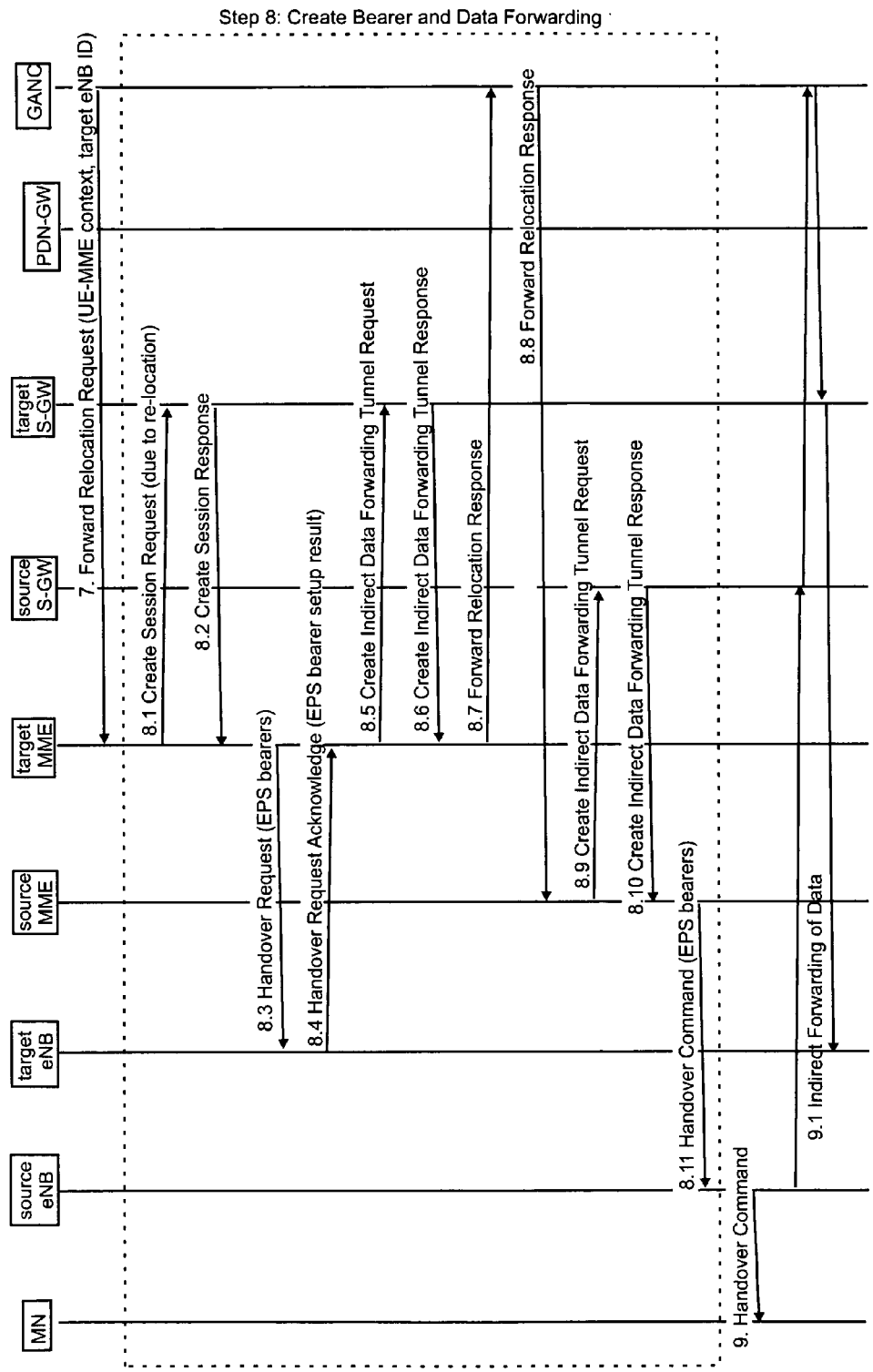
FIG. 14 is a signaling diagram for one of the steps of the detailed embodiment of the invention shown in FIG. 13.

In the following, step 8 of the above-described embodiment will be discussed in more detail with reference to FIG. 14.

7. The GANC sends the Forward Relocation Request with the modified MME UE context to the target MME. The MME UE context includes the Serving GW address and TEID for control signaling, and Serving GW addresses and TEIDs for uplink traffic. The Serving GW addresses included in the original MME UE context are changed to IP addresses of the GANG. Furthermore, the Forward Relocation Request includes the Direct Forwarding Flag that indicates in this mechanism that indirect forwarding is going to be set up by the source side.
8.1 The target MME detects that the source Serving GW (the GANC) can not continue to serve the UE, thus, it selects a new Serving GW. The target MME sends a Create Session Request (bearer context(s) with PDN GW addresses and TEIDs (for GTP-based S5/S8) or GRE (Generic Routing Encapsulation) keys (for PMIP-based S5/S8) at the PDN GW(s) for uplink traffic) message to the target Serving GW.
8.2 The target Serving GW allocates the S-GW addresses and TEIDs for the uplink traffic on S1_U reference point (one TEID per bearer). The target Serving GW sends a Create Session Response (Serving GW addresses and uplink TEID(s) for user plane) message back to the target MME.
8.3 The Target MME sends a Handover Request (EPS Bearers to Setup, AMBR, S1 AP Cause, Source to Target transparent container, Handover Restriction List) message to the target eNodeB. This message creates the UE context in the target eNodeB, including information about the bearers, and the security context. For each EPS Bearer, the Bearers to Setup includes Serving GW address and uplink TEID for user plane, and EPS Bearer QoS.
8.4 The target eNodeB sends a Handover Request Acknowledge (EPS Bearer Setup Result, Target to Source transparent container) message to the target MME. The Bearer Setup Result includes a list of rejected EPS bearers and a list of addresses and TEIDs allocated at the target eNodeB for downlink traffic on S1-U reference point (one TEID per bearer) and addresses and TEIDs for receiving forwarded data if necessary.
8.5 Because indirect forwarding applies and the Serving GW is relocated, the target MME sets up forwarding parameters by sending a Create Indirect Data Forwarding Tunnel Request (Cause, target eNodeB addresses and TEIDs for forwarding) to the Serving GW. The cause of said message indicates that the bearer(s) are subject to data forwarding.
8.6 The Serving GW sends a Create Indirect Data Forwarding Tunnel Response (target Serving GW addresses and TEIDs for forwarding) to the target MME.
8.7 The target MME sends a Forward Relocation Response (Cause, Target to Source transparent container, Serving GW change indication, EPS Bearer Setup Result, Addresses and TEIDs) message to the GANG. Because of indirect forwarding, this message includes Serving GW Address and TEIDs for indirect forwarding (source or target). Serving GW change indication indicates a new Serving GW has been selected.
8.8 The GANC changes the target Serving GW addresses and TEIDs for forwarding to addresses and TEIDs of the GANC. Then, the GANC sends the modified Forward Relocation Response (Cause, Target to Source transparent container, Serving GW change indication, EPS Bearer Setup Result, Addresses and TEIDs) message to the source MME. Because of indirect forwarding, this message includes GANC Address and TEIDs for indirect forwarding (source or target). Serving GW change indication indicates a new Serving GW (i.e. the GANC) has been selected.
8.9 Because of indirect forwarding, the source MME sends Create Indirect Data Forwarding Tunnel Request (Cause, addresses and TEIDs for forwarding) to the source Serving GW. It includes the tunnel identifier to the GANC, and the cause indicates that the bearer(s) are subject to data forwarding.
8.10 The Serving GW responds with a Create Indirect Data Forwarding Tunnel Response (Serving GW addresses and TEIDs for forwarding) message to the source MME.
8.11 The source MME sends a Handover Command (Target to Source transparent container, Bearers subject to forwarding, Bearers to Release) message to the source eNodeB. The Bearers subject to forwarding includes list of addresses and TEIDs allocated at the target eNodeB for forwarding. The Bearers to Release includes the list of bearers to be released.
9. The Handover Command is constructed using the Target to Source transparent container and is sent to the UE. Upon reception of this message the UE will remove any EPS bearers for which it did not receive the corresponding EPS radio bearers in the target cell.

9.1 The source eNodeB starts forwarding of downlink data from the source eNodeB towards the target eNodeB for bearers subject to data forwarding. Because of indirect forwarding, the source eNodeB forwards the data to the source S-GW, the source S-GW forwards the data to the GANC, the GANC forwards the data to the target S-GW and the target S-GW finally to the target eNodeB.

The various embodiments of the invention have several major advantages over the prior art. For instance, unnecessary resource consumption and delay can be avoided since the HPN does not allocate any resources but only relays the handover (adapts and forwards the handover control signaling) without actually processing or finalizing the initiated handover. To said end, the UE previously indicates the inter-PLMN handover to the HPN, together with target VPLMN2 cell ID. Thus, the HPN knows that there is no need to establish Packet Transport Channels for this UE, and further, an optimal GANC can be selected for minimized handover delay.

In addition, the handover doesn't fail due to a wrong disconnection, because the source eNB keeps the connection to the UE until the UE has successfully connected to the target eNB. There is also no risk to encounter loop or flooding during data packet forwarding, because the HPN forwards packets correctly to the target eNB instead of the source eNB.

Figure 7A:
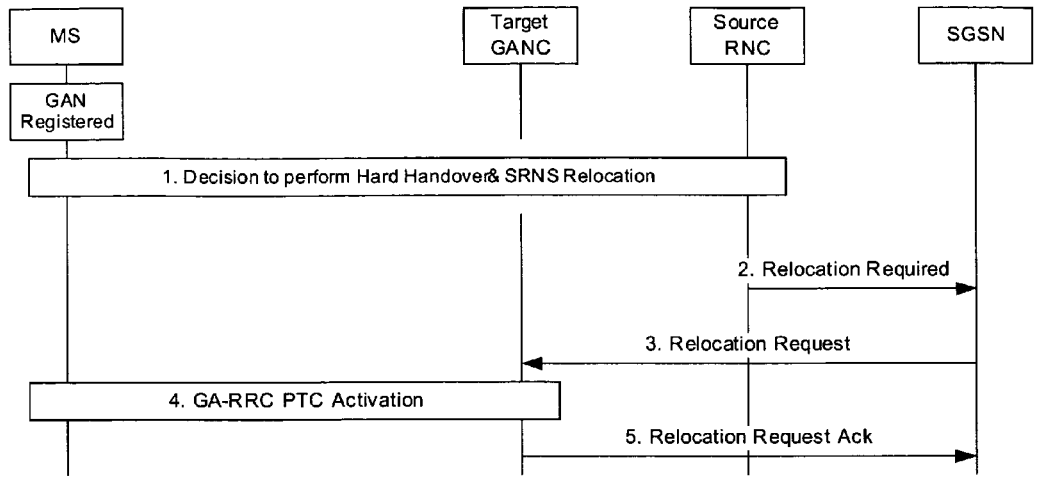
FIG. 7a is a signaling diagram for a preparation phase of a standard GAN Handover from UTRAN to GAN.
Figure 7B:
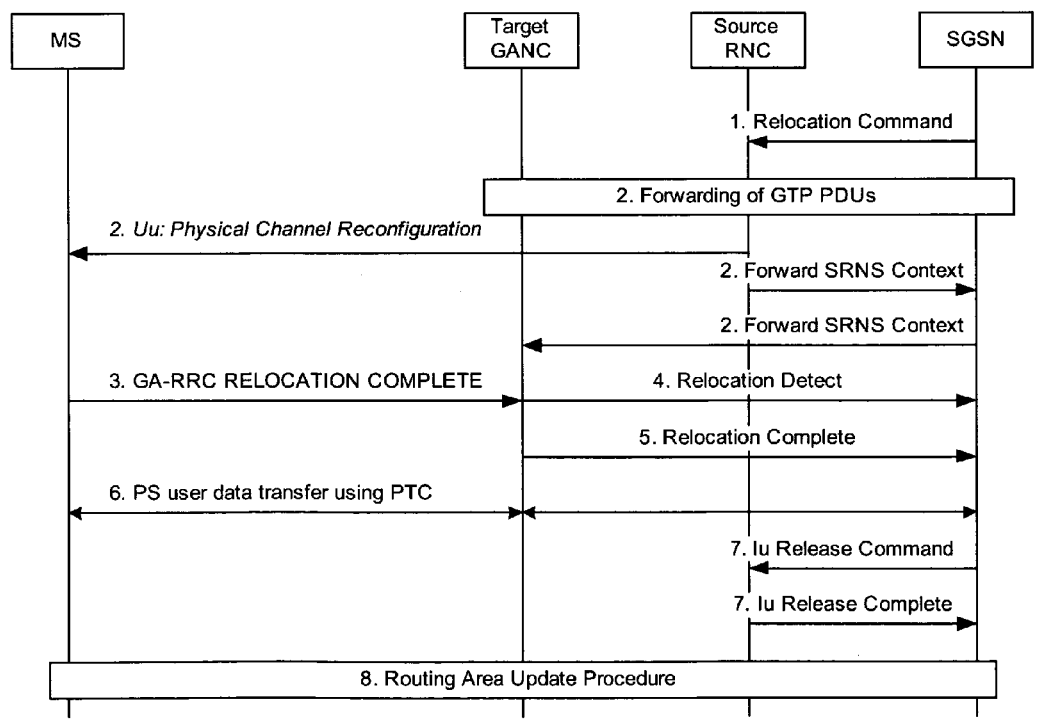
FIG. 7b is a signaling diagram for an execution phase of a standard GAN Handover from UTRAN to GAN.
Figure 8A:
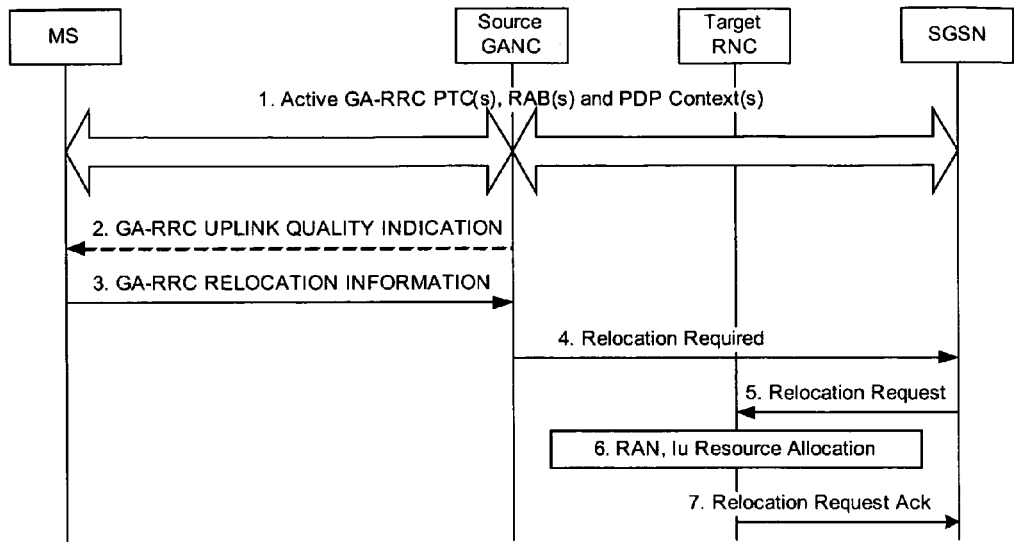
FIG. 8a is a signaling diagram for a preparation phase of a standard GAN Handover from GAN to UTRAN.
Figure 8B:
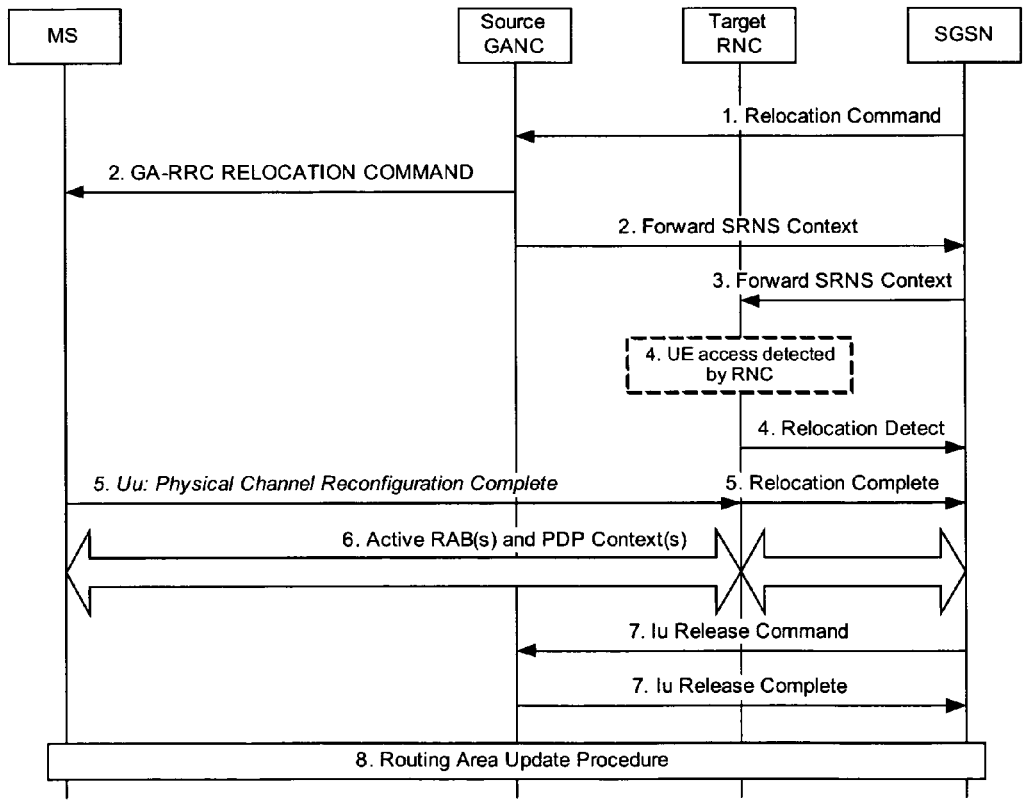
FIG. 8b is a signaling diagram for an execution phase of a standard GAN Handover from GAN to UTRAN.
Figure 9:
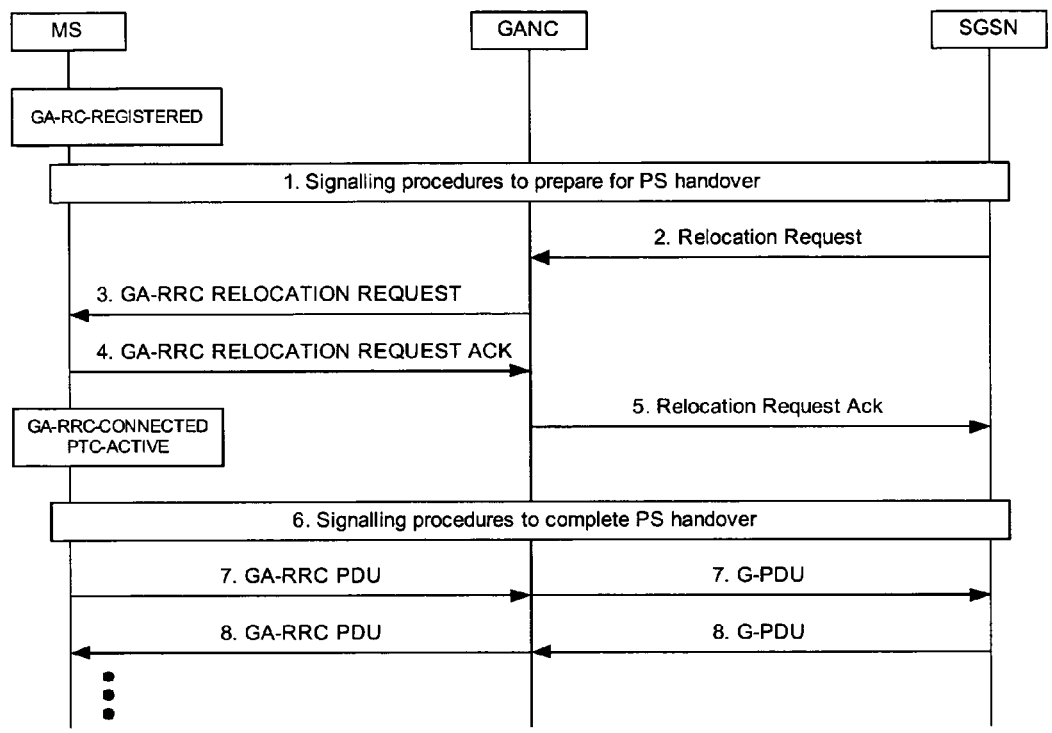
FIG. 9 is a signaling diagram for a standard GAN activation of Packet Transport Channels.

Furthermore, comparing the proposed new solution above with the standard GAN procedures disclosed in FIG. 5-9, the main differences are that in the new solution the UE establishes the connection with the GANC over the source access and an existing PDN connection, whereas in the example of FIGS. 7a and 7b another (non-3GPP) access is used to connect to the GANC. Further, in some of the embodiments of the invention the UE registers with the GANG and sends a trigger to the GANC about the intention to do an inter-PLMN handover, whereas in the example of FIGS. 7a and 7b the UE informs the GANC only about the existing 3GPP access (Cell ID, LAI) and an already used non-3GPP access (AP-ID). Then, in some of the embodiments of the invention the UE, while still being connected to a 3GPP access, establishes an RRC connection with the GANC and sends measured information about another 3GPP access (cell ID and signal strength) to the GANC, whereas in the example of FIGS. 7a and 7b the UE informs the GANC about a handover to a 3GPP access when the UE is connected to a non-3GPP access and has active Packet Transport Channels with the GANG over this non-3GPP access. Next, in some of the embodiments of the invention the eNB triggers a handover to the GANG and the GANC knows about the inter-PLMN handover based on previous triggers; however, with the example of FIGS. 7a and 7b the GANG establishes Packet Transport Channels to the UE in case of handover trigger.

Below will be described another embodiment of the invention, which mainly differs from the previous embodiments of the invention, in the way the embodiment achieves to inform the HPN about the inter-HPLMN handover to the target eNB.

Figures 15A, 15B:
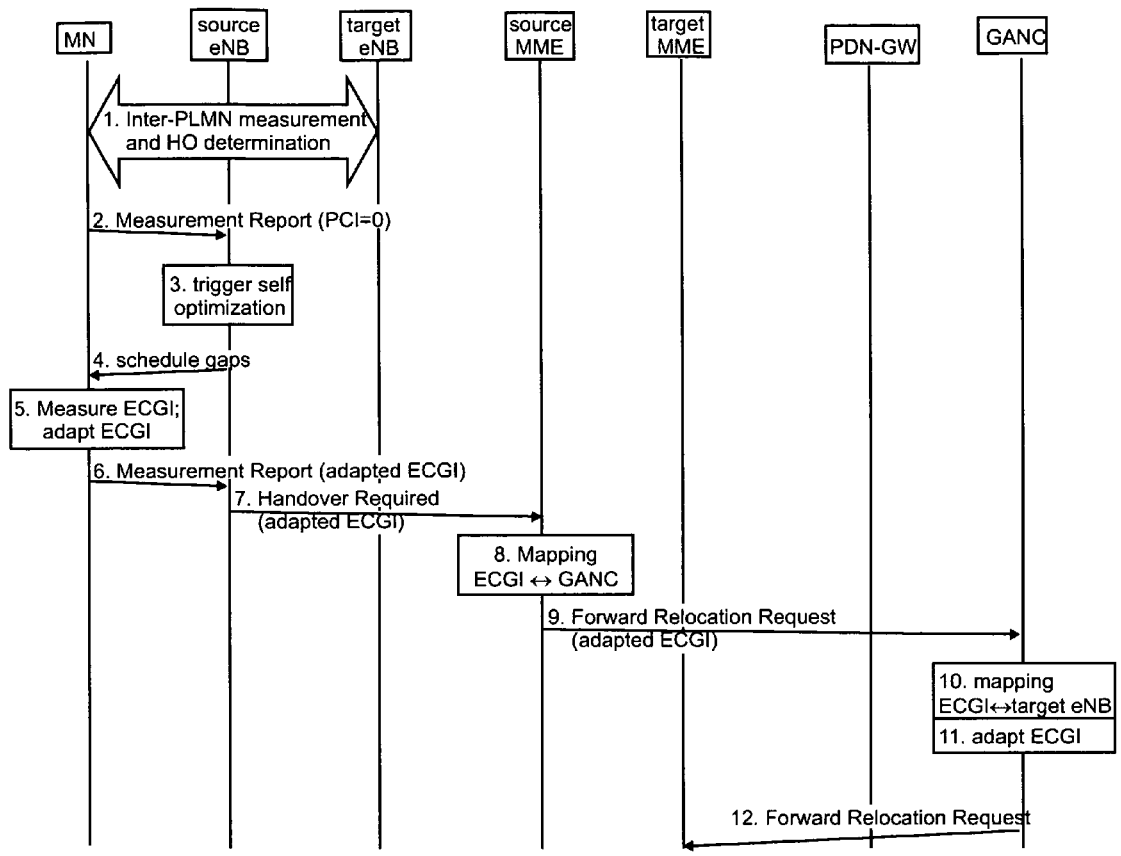
FIG. 15a is a signaling diagram of an inter-VPLMN handover according to another embodiment of the invention.
FIG. 15b shows two ECGIs (Enhanced Cell Global Identity), one of which is amended to encode the target eNB of the initiated handover being the GANC, and to encode the actual destination of the handover which is the target eNB in VPLMN2.

An alternative mechanism, that does not require a connection between the UE and the Handover Proxy Node, but requires support for self-optimization at the source eNB, is described first, with reference to FIGS. 15a and 15b.

In case the source eNB supports self-optimization, the UE may be able to trigger it by reporting a specific pre-determined Physical Cell Identifier (e.g. PCI=0) (step 2). The source eNB start self optimization (step 3) and correspondingly schedules measuring gaps to the UE (step 4) in order to acquire more information on neighbouring cells etc. to self optimize various aspects of the system, such as antenna parameters, neighbour lists or other resource parameters. Accordingly, the MN starts measurements on the target cell and learns the ECGI of the target cell.

However, if the UE would report the measured ECGI and VPLMN2 ID to the source eNB, the source eNB would not trigger a handover, because there is no roaming agreement between VPLMN1 and VPLMN2 that would allow a handover and the corresponding context exchanges. Therefore, the UE modifies the VPLMN2 ID of the measured ECGI to a new PLMN ID that is equivalent to VPLMN1 (EVPLMN1) (step 5). Furthermore, the new PLMN ID includes information about VPLMN2 and points to the HPLMN as the destination of the handover. Then, the UE generates a measurement report including the adapted information and the measurement results and transmits same to the VPLMN1 eNB (step 6). Accordingly, the source eNB does not add the cell to its neighbour relation list and initiates the handover by transmitting the adapted ECGI to the source MME in a Handover Required message. The cell is not added to the neighbour relation list of the source eNB because otherwise the pre-determined PCI would no longer be unknown to the source eNB, and thus the reporting of the pre-determined PCI would not trigger a self optimization in the source eNB.

The source MME then infers from the ECGI enclosed in the Handover Required message the GANC as the destination of the handover (step 8), and thus transmits a Forward Relocation Request message to the GANG, including the adapted ECGI (step 9).

When the GANC receives the Forward Relocation Request message, the GANC learns from the adapted ECGI that the GANC is not the destination of the handover but that it merely shall act as relay between the source network VPLMN1 and the indicated target network VPLMN2 (step 10). The Forward Relocation Request message includes in the MNC of the adapted ECGI an indication for the GANC to determine that the Forward Relocation Request message belongs to an inter-VPLMN handover to the target network.

The GANC adapts the modified ECGI back to the real ECGI (step 11), creates the necessary UE-MME context and forwards the handover towards the target eNB, i.e. first to the target MME and then to the target eNB (step 12).

FIG. 15b illustrates how the ECGI may be adapted to encode the VPLMN2 as actual handover destination and the HPLMN as relay.

The PLMN IDs may be for example as follows:
HPLMN=Vodafone Germany=262.09 (MCC.MNC)
VPLMN1=Softbank Japan=440.04
VPLMN2=DoCoMo Japan=440.01

The MN may then generate the following Equivalent VPLMN1=440.901.

The ECGI 440.901 is registered in VPLMN1 as an equivalent PLMN, whereby MCC identifies Japan, the adapted MNC is allocated by Vodafone (9xx) (HPLMN, from which the GANC can be discovered) and indicates DoCoMo network (x01) (target network). The ECI identifies the target eNB.

Figure 16:
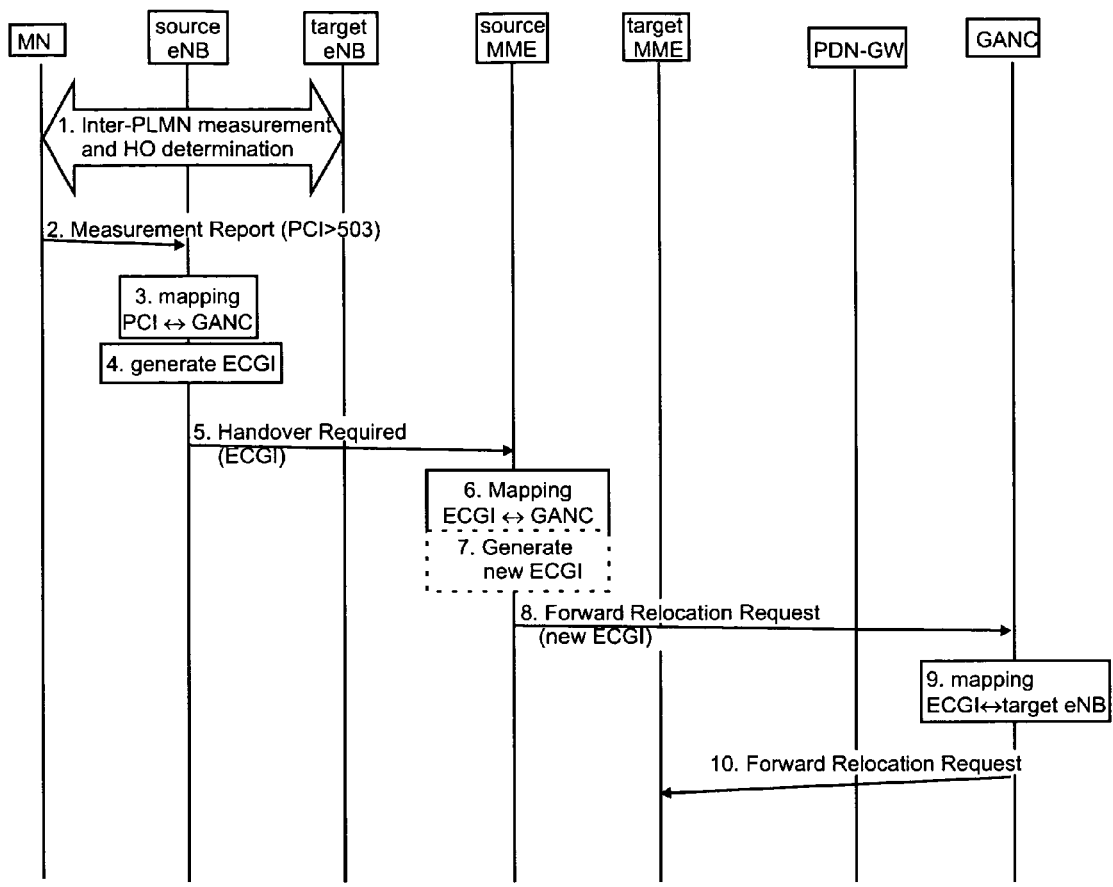
FIG. 16 is a signaling diagram of an inter-VPLMN handover according to another embodiment of the invention.

Another alternative embodiment of the invention will be described below with reference to FIG. 16. In particular, this embodiment neither requires a direct connection between the MN and the GANC nor self-optimization support at the source eNB. However, the source eNB and the source MME have to be additionally configured, as will be outlined below.

Usual PCI values are in the range of [0 . . . 503], the UE however will send a PCI>503 in the Measurement Report to the source eNB (step 2). For this the UE might be configured with a PLMN specific offset value that is added in the measurement report to the measured PCI value. Or alternatively, the target base station may send the PCI value to be used for inter-PLMN handover in a broadcast channel. The PCI value, e.g. 600, corresponds to the measured target cell. The source eNB in VPLMN1 is configured to accept PCI values>503 and based on the fact that the PCI value is >503, it may infer that the actual destination for the handover shall be the GANC (step 3). The source eNB then generates (maps the PCI to an ECGI based on a mapping table) an ECGI from the received PCI (step 6), wherein the ECGI is generated so that the source MME will infer the GANC as handover destination and the GANC may infer the actual destination of the handover being the target eNB of the target network (compare FIG. 15b).

Alternatively, the source eNB may generate an ECGI based on the received PCI from which source MME may then infer the GANC as Handover destination. Then, the source MME would amend the ECGI (step 7) so that it allows the GANG to identify the target eNB as actual destination of the handover of the mobile node (alternative step 7).

The new ECGI will be transmitted from the source MME to the GANG in a Forward Relocation Request message (step 8). Based on the received ECGI, the GANG is able to determine that the handover is to be forwarded to the target eNB of VPLMN2. Accordingly, the Forward Relocation Request is adapted to indicate a handover from the GANC to the target eNB, including new UE-MME contexts etc (step 10).

Security Considerations

In the above presented embodiments of the invention the context transfer between the source MME and the target MME is not dealt with in detail. However, further changes to the system might become necessary in order to allow the context transfer as assumed in the previous embodiments of the invention.

For authentication of a UE in a 3GPP access, EPS authentication vectors (AVs) are transferred from the HSS in the home network of the UE to the MME in the serving PLMN. Usually the AVs include RAND (RANDom number), AUTN (AUthentication TokeN), XRES (eXpected RESponse) and $K_{ASME}$ (ASME: Access Security Management Entity). The $K_{ASME}$ is computed from the ciphering key (CK), the integrity key (IK) and the serving network's identity (e.g. VPLMN1). Thus, different PLMNs require different AVs. During a normal handover (intra-PLMN), the security context is transferred from one MME to another MME within the same PLMN. However, one of the security requirements in 3GPP is that EPS authentication vectors shall not be distributed between MMEs belonging to different serving domains (PLMNs). Consequently, in the inter-PLMN handover according to the various embodiments of the invention, the MN needs to be authenticated in the target access, however, the necessary context transfers between the source and target MME is not allowed.

One possibility to overcome said problem could be to relax the security requirements, i.e. to allow forwarding of context between MMEs of different PLMNs and for example to allow use of transferred keys only once to establish the connection with the target access. Then, an immediate update of the security context would be requested after the connection is established, e.g. by a Tracking Area Update (TAU) procedure that is triggered due to the change of the Tracking Area (TA).

However, this relaxed security requires changes to existing procedures and to legacy core network equipment (MMEs) in order to support forwarding of security context to different PLMNs.

Another possibility could be to configure the Handover Proxy Node in the HPLMN as a shared network node. This means that the Handover Proxy Node in the HPLMN is a shared network node between the HPLMN and the VPLMNs, i.e. it is virtually part of the VPLMNs.

In this case for UEs in VPLMN1 the Handover Proxy Node belongs to VPLMN1, i.e. the MME in VPLMN1 is forwarding the context to another MME in VPLMN1. For UEs in VPLMN2 the Proxy Node belongs to VPLMN2, i.e. the context received at the MME in VPLMN2 is coming from an MME in VPLMN2. That the shared network node in HPLMN can be used by the VPLMN would be part of the roaming agreements and does not require changes to procedures or equipment but only needs proper configuration on the VPLMN side.

The above solution allows the transfer of context from VPLMN1 to HPLMN and also transfer of context from HPLMN to VPLMN2. However, the $K_{ASME}$ and NAS (Non-Access-Stratum) keys included in the context are derived from VPLMN1 ID and may not be used in VPLMN2.

Figure 17:
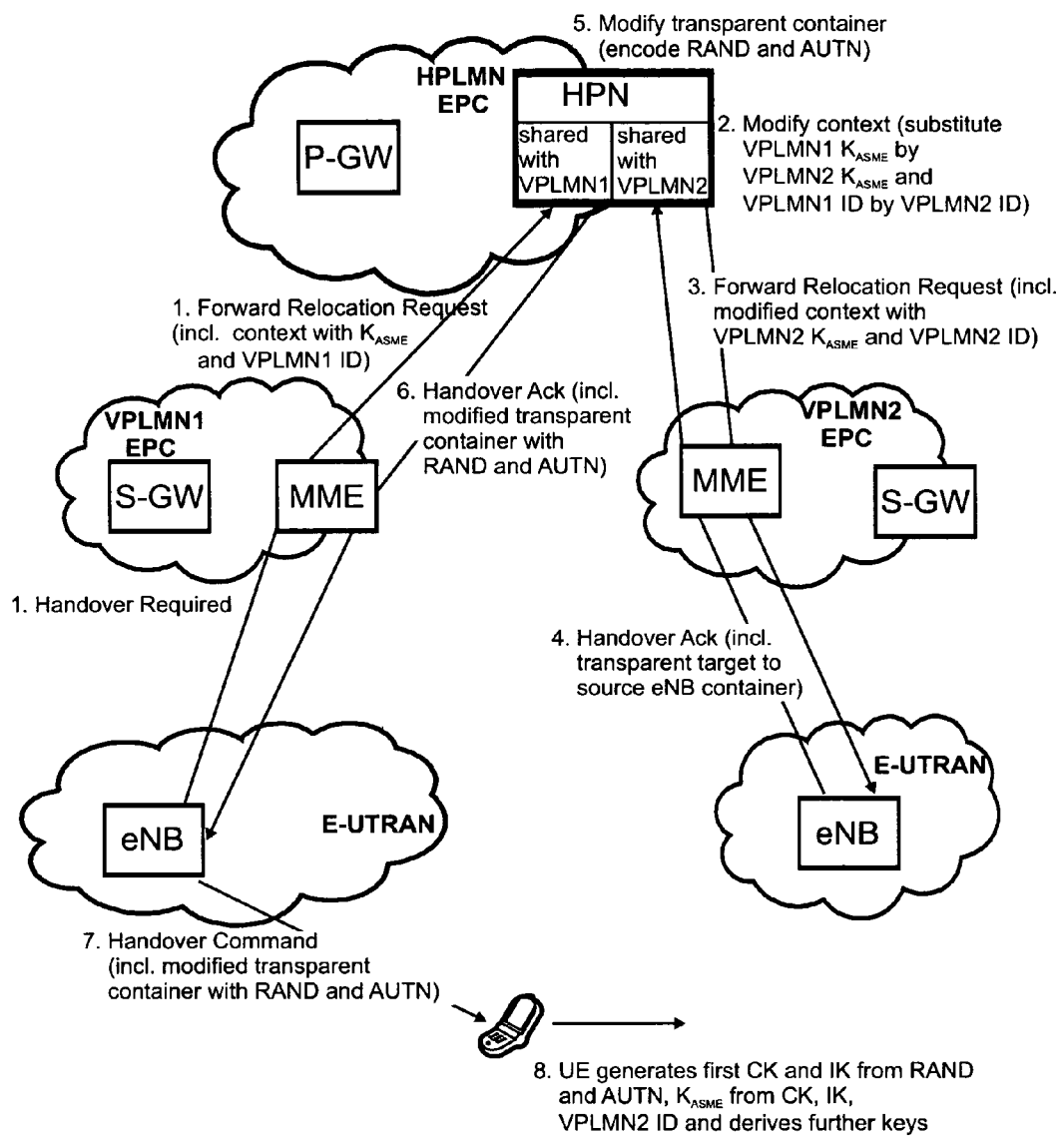
FIG. 17 illustrates the network deployment and message exchange of an inter-VPLMN handover according another embodiment of the invention, wherein security contexts are generated for allowing the UE to be authenticated in the target access.

In order to overcome the problem that the transferred context includes VPLMN1 specific keys and IDs, the UE and Proxy Node shall create new $K_{ASME}$ and NAS keys based on the VPLMN2 ID. An embodiment to provide said functionality will be explained with reference to FIG. 17.

The source eNB after receiving the trigger (Measurement Report) from the UE to perform a handover, transmits the Handover Required message to the source MME, which in turn generates the Forward Relocation Request message including the UE-MME context with the $K_{ASME}$ based on the VPLMN1-ID. The source MME then transmits the Forward Relocation Request message to the HPN (step 1).

When the Forward Relocation Request message with the security context is received at the HPN, the Handover Proxy Node generates a new $K_{ASME}$ based on VPLMN2, whose identity is received e.g. depending on the embodiment either with the Forward Relocation Request message or previously during the HPN discovery and registration. Correspondingly, the HPN may then substitute the old VPLMN1 $K_{ASME}$ with the new VPLMN2 $K_{ASME}$ (step 2). In addition, the VPLMN 1 ID is also substituted by the VPLMN2 ID, amongst other things. The HPN then forwards the adapted Forward Relocation Request with modified UE-MME context including the VPLMN2 $K_{ASME}$ to the target network (target MME first and then target eNB) (step 3). The eNodeB in the VPLMN2 acknowledges the handover and includes a transparent target to source eNodeB container in the Handover Ack message (step 4) transmitted back via the HPN to the source network.

It is now necessary that the UE also holds the VPLMN2 $K_{ASME}$. For the UE to be able to generate a new $K_{ASME}$ it needs the new RAND and AUTN of VPLMN2. Thus, the Handover Proxy Node modifies the Handover Acknowledge message from VPLMN2 by encoding the RAND and AUTN belonging to the VPLMN2 $K_{ASME}$ into the transparent container (step 5) before sending it to VPLMN1 (step 6). The source eNodeB forwards the transparent container in the Handover Complete message to the UE (step 7), and the UE generates a new CK and IK using the RAND and AUTN and then generates the VPLMN2 $K_{ASME}$ using the CK, IK and VPLMN2 ID (step 8).

With this procedure no changes to the source or target network are required. The modified transparent container is simply forwarded from the source eNB to the UE, and thus the source eNB is not aware of the modification.

Alternatively, instead of transmitting the RAND and AUTN within the Handover Acknowledge message to the VPLMN1 for the UE to calculate the VPLMN2 $K_{ASME}$, the HPN may directly include the VPLMN2 $K_{ASME}$ into the Handover Acknowledge message.

Measurement Considerations

In the previous embodiments of the invention, the UE performs measurements on neighbouring cells in order to determine whether an handover is preferable and if that is the case, to which particular cell the handover should be performed.

During normal intra-PLMN handover the UE is triggered to measure cells of other eNBs. In case the other cells are on a different frequency than the current cell, the UE is informed by the source eNB about the frequencies and in addition a measurement gap is allocated by the source eNB to the UE. During the measurement gap no downlink data is sent to the UE and the UE can measure other cells.

However, in the previous embodiments provided above there is no roaming agreement between VPLMN1 and VPLMN2. Thus, the UE is not triggered to measure VPLMN2 cells and therefore the UE is not able to measure VPLMN2 cells. Furthermore, even if the UE would be able to measure VPLMN2 cells, the VPLMN1 is not able to process measurements of the VPLMN2 cells because the source eNB does not know nor cannot learn the ECGI and thus cannot map the PCI to an ECGI.

First, the UE needs to know which frequencies to measure. There are various alternatives, some of which will be explained in the following.

The UE can ask some database (e.g. ANDSF (Access Network Discovery and Selection Function) in HPLMN) or before leaving the HPLMN (e.g. during IDLE mobility), the UE can be informed about frequencies of cells in neighbouring VPLMNs.

Figure 18:
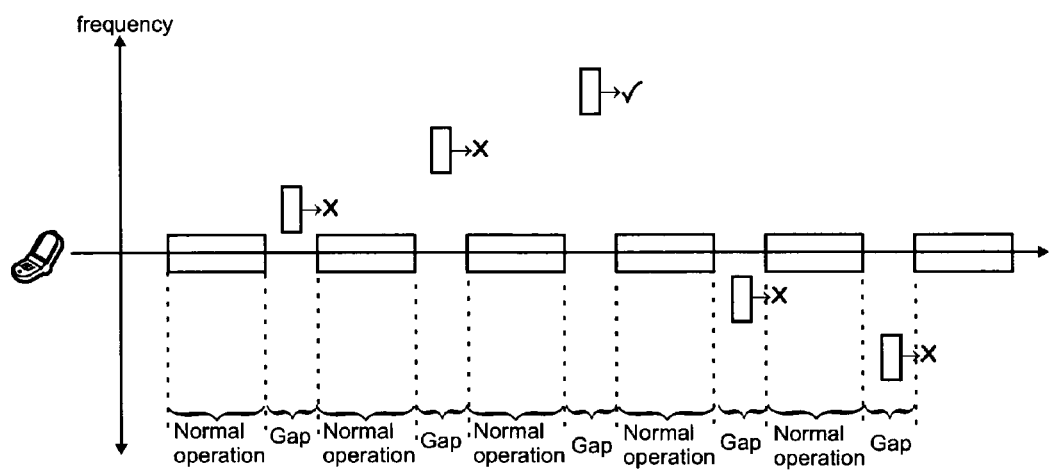
FIG. 18 is a diagram illustrating the inter-frequency measurements performed by the UE in order to determine a handover and possible handover destinations according to an embodiment of the invention.

Alternatively, in case the UE does not know which frequencies to measure, measurement gaps are used by the UE to scan other frequencies, as illustrated in FIG. 18. During the gaps, the UE picks not yet scanned frequencies and tries to scan only the primary synchronization signal in order to determine whether there is a cell on this frequency or not.

The measurement gap is usually allocated by the source eNB. In case of a system with different frequency layers, gap assisted measurements can be used, and the source eNB would allocate measuring gaps to the UE, which the UE then can use for the inter-VPLMN measurements if necessary.

However, in case of a system with frequency reuse (i.e. the same frequency is used for various cells), the UE would only be triggered to do measurements without a measuring gap. For some of the embodiments of the invention however it is necessary that measuring gaps are allocated to the UE for the inter-VPLMN handover measurements, despite the system reusing frequencies. One possibility to trigger the network to allocate a gap is that in case the UE is measuring intra-frequency neighbouring cells and the quality to the current cell is still good, the UE pretends that no cells have been measured, i.e. the UE does not report the measured cells. In addition or alternatively, the UE can report in its Radio Access Capabilities that it supports GERAN/UTRAN/CDMA2000 even if it does not. Then, because of no reports or because of support of other access technologies, the network may be triggered to allocate a gap.

In the mechanism above, the measurement gap is allocated by the eNB. But depending on the eNB implementation this UE triggering the eNB may not work. In this case the following alternative embodiments may be used.

After registering with the GANC the UE sends a gap request to the GANG (e.g. with a required time in ms), and optionally, the UE may include a specific token. Then, the GANC signals to the UE's PDN-GW a gap request incl. the time and optionally the token. The PDN-GW buffers packets at a dedicated point in time for the indicated time and adds the received token or a self-generated token to the last data packet before the buffering starts (or the token is the last data packet). The UE receives the packet with the token and knows that it has now the requested time for measurements before the next downlink packet should arrive.

After the UE has detected the frequencies of neighbouring cells, it may need more time to measure several information (e.g. ECGI, Tracking Area Code (TAC), PLMN ID) from the broadcast channel.

If the source eNB supports self-optimization it may trigger a UE to measure and report additional information when a reported cell ID is unknown to the source eNB. Thus, one possible way for the UE to acquire more time is that the UE reports dummy cell IDs in order to trigger the network to start self-optimization. But because the UE does not know whether there is a real cell with the cell ID equal to the reported dummy cell ID in the neighbourhood of the current source eNB, the UE should report a signal quality that is relatively low, in order to avoid that the eNB triggers a handover to the dummy cell. The network starts self-optimization, schedules longer gaps (idle periods) and asks the UE to measure the System Information Block Type 1 including ECGI, TAC, PLMN IDs. Now, the UE has enough time to measure the necessary information.

Figure 19:
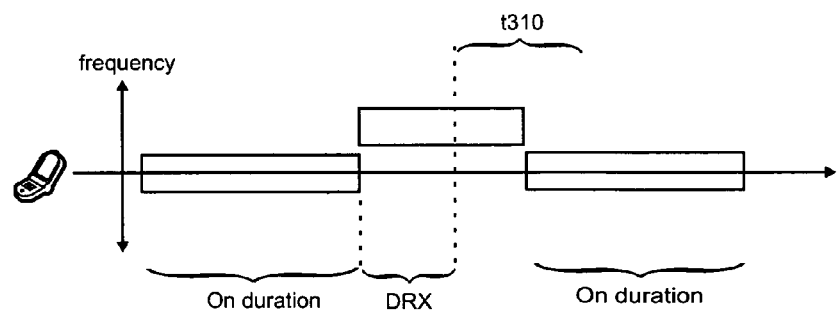
FIG. 19 is a diagram illustrating a measuring gap achieved by prolonging the off-duration after a DRX mode according to another embodiment of the invention.

Another way to get more time for measurements without self-optimization is to prolong an off duration period, i.e. a period without downlink traffic. This means that the UE stays in CONNECTED state and tries to get the eNB to allocate off duration periods. During the off duration the UE scans the other PLMNs. In case the allocated periods are not sufficient, the UE prolongs the off durations for a short period, to be able to complete scanning the other PLMNs (see FIG. 19).

In order to trigger the eNB to allocate off duration periods, the UE may set the channel conditions CQI=0 (out of range), when reporting CQI of the current VPLMN1 cell during control signalling. This may force the eNB to configure DRX for the UE in order to avoid many packet losses during short periods of bad channel conditions. When DRX is configured for the UE (e.g. 40 ms inactive time) and the DRX is not sufficient, the UE prolongs the DRX in order to measure the required additional information (ECGI, PLMN IDs, CSG ID, TAC). The UE prolongs measurements<40 ms+t310 (upon expiry of t310 the network would assume a radio link failure), in order to avoid release of UE context in eNodeB. Usually, in case th UE notices lower-layer connection problems, the t310 timer is triggered. In case the t310 timer expires when the lower-layer connection problems are not solved, the UE assumes a link failure which comprises a RRC connection re-establishment. This takes a lot of time, and should thus be avoided. In order to avoid same, after measurement is completed, the UE pretends to suffer from radio problems and resumes the RRC connection without signalling. In more detail, the mobile node doesn't do anything. He acts if as the lower-layer has signaled several consecutive "in-sync" indications, i.e. everything is OK, and the UE does not signal any failure to the network and keeps using the current radio resource configuration.

After the scanning is completed, the UE can decide to handover to the VPLMN2 cell, e.g. based on measured VPLMN1 cell ID and VPLMN2 cell ID. The UE knows that it will loose VPLMN1 cell coverage soon, or the UE knows that cost is lower or QoS is higher in the VPLMN2 cell.

Usually, the mobility in 3GPP systems is network-controlled, wherein in the embodiments of the present invention the UE will transmit the Measurement Reports on his own to trigger the handover procedure in the source eNB. Therefore, the UE needs to scan and handover to other PLMNs without being triggered by the source network to scan or handover.

A possible trigger for the UE to scan other cells could be the location, i.e. the UE has knowledge that coverage of current PLMN is limited. For instance, UE is close to the border of a country or entering a building. Another possible trigger to scan other cells could be depending on the service/application, e.g. the UE starts in addition a new application and depending on the expected duration of the application the UE may decide that another PLMN is preferable. For example a video call is expected to take longer, or a VPN connection is longer than a normal voice only call.

A possible trigger for the UE to do the handover could be that the signal strength is getting low and no other cells of that PLMN are measured, or the QoS for active applications is low or not sufficient, or the cost in the currently used PLMN is high compared to other scanned PLMNs. Another possible trigger for handover could be a change of the UE behaviour, e.g. the movement changes, for example speed of UE/user increases, i.e. from pedestrian to car, or a new application is started, e.g. video streaming requiring higher throughput.

In case the UE measures several cells of different PLMNs, the UE needs to select one of the PLMNs. As already explained before, it may also be possible to report the measurement result of the various cells to the HPN, and the HPN then selects one of the PLMNs.

One possible way to determine which PLMN to select is that the UE reports measured PLMNs to a server in the HPLMN, and the HPLMN tells the UE which one to select. Another possibility is that the UE has a PLMN priority list of VPLMNs that have a roaming agreement with the HPLMN, and one of the measured VPLMNs has a higher priority than the current VPLMN. The UE may create such a priority list based on history (and other e.g. speed, location, cost) information. The UE may know that e.g. in case the UE moves fast or is entering building, VPLMN2 (using lower frequencies, 800 MHz) is better than VPLMN3 (using higher frequencies, 2100 Mhz) and on the other hand if UE is stationary or outside, VPLMN3 is better than VPLMN2. An additional possibility is that the UE uses the load in the cell as criteria for PLMN determination, i.e. the UE may measure other cells and use the cell with lowest load. The UE investigates activity on control channel or measures power of resource blocks and assumes that a cell with low activity on the control channel or many resource blocks with low power is less loaded. Another way is that the UE measures other MCCs in the vicinity and knows that it will cross the country border soon.

Figure 20:
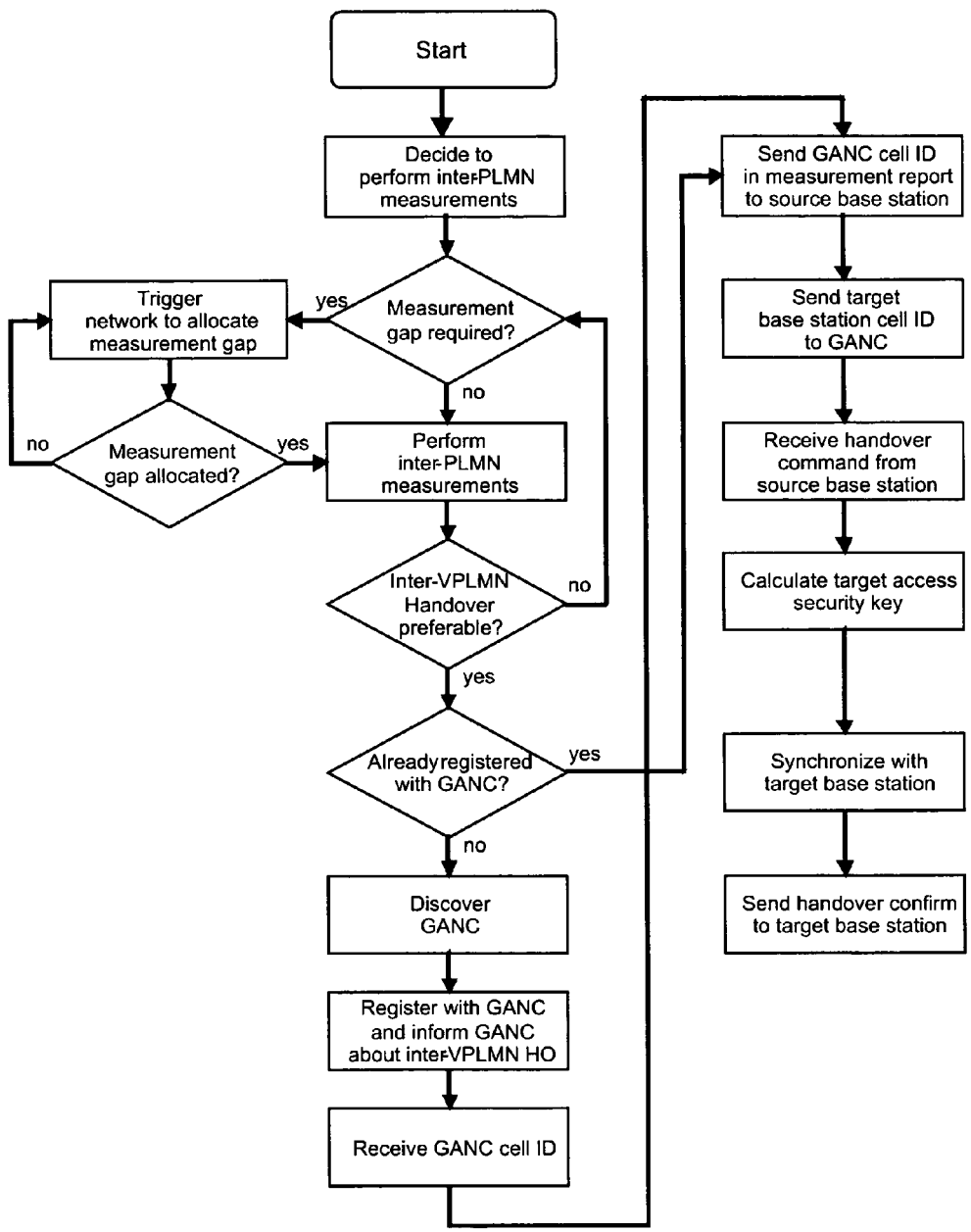
FIG. 20 is a block diagram of the processes performed by the mobile node according to one of the embodiments of the invention.

FIG. 20 discloses a block diagram for the MN processes performed for one of the embodiments of the invention. After the UE decides to perform inter-PLMN measurements, the MN determines whether a measurement gap is necessary; e.g. when measuring other frequencies than currently used. In case no measurement gap is necessary, the MN performs the inter-PLMN measurements. In case a measurement gap is necessary, the MN needs to trigger the source eNB to allocate measuring gaps to be able to perform the measurements.

After analyzing the measuring results, the MN decides whether an inter-VPLMN handover is preferable. If not, the MN tries to perform measurements on further cells, and thus returns to the step of deciding whether a measuring gap is necessary. If an inter-VPLMN handover is preferable, the MN first determines whether it is already registered with a GANC (as HPN). If no HPN is registered, the MN discovers an appropriate GANC, registers with the discovered GANC and thus receives the GANC cell ID.

If the MN was already registered with a GANG, the MN already holds a GANG cell ID, and may then send the GANC cell ID together with the measurements in a Measurement Report message to the source eNB to trigger the inter-VPLMN handover in the source eNB. The UE also informs the HPN on the actual destination of the handover which is the target eNB in the target network.

Next, the UE receives the handover command from the source base station. Depending on the embodiment of the invention, it might also be necessary for the UE to calculate an target access security key so as to authenticate the MN in the target access. The UE then detaches from the old cell and connects to the new cell by synchronizing with the target base station. After that, a handover confirm message is transmitted to the target base station.

The explanations given in the Technical Background section above are intended to better understand the specific exemplary embodiments described herein and should not be understood as limiting the invention to the described specific implementations of processes and functions in the mobile communication network. Nevertheless, the improvements proposed herein may be readily applied in the architectures/systems described in the Technological Background section and may in some embodiments of the invention also make use of standard and improved procedures of theses architectures/systems. It would be appreciated by a person skilled in the art that numerous variations and/or modifications may be made to the present invention as shown in the specific embodiments without departing from the spirit or scope of the invention as broadly described.

Another embodiment of the invention relates to the implementation of the above described various embodiments using hardware and software. It is recognized that the various embodiments of the invention may be implemented or performed using computing devices (processors). A computing device or processor may for example be general purpose processors, digital signal processors (DSP), application specific integrated circuits (ASIC), field programmable gate arrays (FPGA) or other programmable logic devices, etc. The various embodiments of the invention may also be performed or embodied by a combination of these devices.

Further, the various embodiments of the invention may also be implemented by means of software modules, which are executed by a processor or directly in hardware. Also a combination of software modules and a hardware implementation may be possible. The software modules may be stored on any kind of computer readable storage media, for example RAM, EPROM, EEPROM, flash memory, registers, hard disks, CD-ROM, DVD, etc.

The invention claimed is:

1. A method for performing a seamless handover of a mobile node from a source network to a target network, wherein a handover proxy node is located in a further network, the method comprising the steps of:
  initiating a handover procedure of the mobile node from the source network to the handover proxy node, using an identifier of the handover proxy node and without using an identifier of the target network, and
  without completing handover of the mobile node to the handover proxy node, relaying by the handover proxy node to the target network control signaling related to the initiated handover procedure, using the identifier of the target network, previously received by the handover proxy node, in order to perform a seamless handover of the mobile node from the source network to the target network, wherein the step of initiating the handover procedure comprises the following steps:
deciding by the mobile node to perform a handover to the target network,
transmitting a handover trigger message from the mobile node to a source base station to which the mobile node is connected in the source network, indicating the handover proxy node as the destination of the triggered handover, and
transmitting by the source base station a handover initiation message towards the handover proxy node, upon receiving the handover trigger message, and
wherein the step of relaying by the handover proxy node the control signaling comprises the steps of:
receiving in the handover proxy node a handover initiation message indicating a handover of the mobile node from the source network to the handover proxy node,
adapting by the handover proxy node the handover initiation message to indicate a handover of the mobile node from the handover proxy node to the target network, using the identifier of the target network, and
transmitting by the handover proxy node the adapted handover initiation message towards a target base station in the target network.

2. The method for performing a seamless handover according to claim 1, wherein the identifier of the target network is provided to the handover proxy node
when discovering by the mobile node the handover proxy node in the further network,
or in a dedicated message to the handover proxy node.

3. The method for performing a seamless handover according to claim 1, wherein the identifier of the handover proxy node is provided to the mobile node when discovering by the mobile node the handover proxy node in the further network.

4. The method for performing a seamless handover according to claim 1, wherein a source base station, to which the mobile node is connected in the source network, allocates measuring gaps in the downlink resources for the mobile node, in order for the mobile node to measure cells in neighboring networks of the source network, when the following step is performed:
indicating by the mobile node to the source base station that no cells of neighboring networks could be measured, or
indicating by the mobile node to the source base station that the mobile node supports radio access technologies, wherein the radio access technologies are not supported by the mobile node, or
indicating by the mobile node to the source base station a cell identifier, unknown to the source base station.

5. The method for performing a seamless handover according to claim 1, wherein a predetermined channel condition information is transmitted from the mobile node to the source base station, to trigger a discontinued reception mode for the mobile node,
wherein the mobile node performs measurements on cells in neighboring networks of the source network during the time of the discontinued reception mode.

6. The method for performing a seamless handover according to claim 1, wherein the handover procedure comprises the step of authenticating the mobile node in the target network using a target network specific authentication key, the method further comprising the steps of;
generating by the handover proxy node the target network specific authentication key, by using information specific to the target network authentication key,
replacing by the handover proxy node a source network specific authentication key in a handover initiation message received from the source network with the generated target network specific authentication key, and
forwarding the handover initiation message, comprising the generated target specific authentication key, to the target network.

7. The method for performing a seamless handover according to claim 6, wherein the generated target network specific authentication key is transmitted from the handover proxy node to the mobile node, or
wherein the information specific to the target network authentication key is transmitted from the handover proxy node to the mobile node, and the mobile node generates the target network specific authentication key using the received information specific to the target network authentication key.

8. A mobile node for performing a seamless handover from a source network to a target network, wherein a handover proxy node is located in a further network, the mobile node comprising:
a processor that initiates a handover procedure of the mobile node from the source network to the handover proxy node, using an identifier of the handover proxy node, and without using an identifier of the target network, the processor further informs the handover proxy node, without completing handover of the mobile node to the handover proxy node, to relay to the target network control signaling, related to the initiated handover procedure, using the identifier of the target network, previously received by the handover proxy node, in order to perform a seamless handover of the mobile node from the source network to the target network, and the processor decides to perform a handover to the target network, and
a transmitter that transmits a handover trigger message from the mobile node to a source base station to which the mobile node is connected in the source network, indicating the handover proxy node as the destination of the triggered handover,
wherein the source base station transmits a handover initiation message towards the handover proxy node, upon receiving the handover trigger message, and
wherein the handover proxy node relays the control signaling by receiving in the handover proxy node a handover initiation message, indicating a handover of the mobile node from the source network to the handover proxy node, adapting by the handover proxy node the handover initiation message to indicate a handover of the mobile node from the handover proxy node to the target network, using the identifier of the target network, and transmitting by the handover proxy node the adapted handover initiation message towards a target base station in the target network.

9. The mobile node according to claim 8, wherein the processor and a transmitter provide the identifier of the target network to the handover proxy node when discovering by the mobile node the handover proxy node in the further network, or in a dedicated message to the handover proxy node.

10. The mobile node according to claim 8, wherein
the processor indicates to the source base station that no cells of neighboring networks could be measured, or
the processor indicates to the source base station that the mobile node supports radio access technologies, wherein the radio access technologies are not supported by the mobile node, or
the processor indicates to the source base station a cell identifier, unknown to the source base station, in order for a source base station, to which the mobile node is connected in the source network, to allocate measuring gaps in the downlink resources for the mobile node measure cells in neighboring networks of the source network.

11. The mobile node according to claim 8, wherein the processor further transmits a predetermined channel condition information to the source base station, to trigger a discontinued reception mode for the mobile node, and the processor further performs measurements on cells in neighboring networks of the source network during the time of the discontinued reception mode.

12. A handover proxy node located in a further network for relaying a handover of a mobile node from a source network to a target network, comprising:

a receiver that receives a handover message, transmitted by a source base station towards the handover proxy node, upon receiving a handover trigger message from the mobile node, to initiate handover of the mobile node from the source network to the handover proxy node, the handover message including an identifier of the handover proxy node and not including an identifier of the target network and, a processor that, without completing handover of the mobile node to the handover proxy node, relays to the target network control signaling, related to the received handover message of the mobile node, using the identifier of the target network, previously received by the handover proxy node, in order to perform a seamless handover of the mobile node from the source network to the target network, wherein initiating the handover of the mobile node from the source network to the target network comprises deciding by the mobile node to perform a handover to the target network, and transmitting a handover trigger message from the mobile node to a source base station to which the mobile node is connected in the source network, indicating the handover proxy node as the destination of the triggered handover, and wherein the relaying of the control signaling to the target network includes receiving in the handover proxy node a handover initiation message, indicating a handover of the mobile node from the source network to the handover proxy node, adapting by the handover proxy node the handover initiation message to indicate a handover of the mobile node from the handover proxy node to the target network, using the identifier of the target network, and transmitting by the handover proxy node the adapted handover initiation message towards a target base station in the target network.

* * * * *